United States Patent [19]

Prednis et al.

[11] Patent Number: 5,036,479
[45] Date of Patent: Jul. 30, 1991

[54] MODULAR AUTOMATED AVIONICS TEST SYSTEM

[75] Inventors: Leonard J. Prednis; Michael L. Proctor, both of San Diego; Alan D. Sugarman, Poway, all of Calif.

[73] Assignee: TRW Inc., Redondo Beach, Calif.

[21] Appl. No.: 341,020

[22] Filed: Apr. 20, 1989

[51] Int. Cl.$^5$ .................................... G01D 18/00
[52] U.S. Cl. .......................... 364/580; 371/22.4; 324/158 R; 364/580
[58] Field of Search .......... 364/550, 551.01, 424.01, 364/424.03, 431.01, 580, 200, 900, 571.01, 571.02, 571.05, 571.06; 371/15.1, 16.1, 16.5, 17, 22.4, 29.1; 340/514, 945; 324/73.1, 158 R; 73/116

[56] References Cited

U.S. PATENT DOCUMENTS

| | | | |
|---|---|---|---|
| 4,376,298 | 3/1983 | Sokol et al. | 364/571.01 X |
| 4,393,498 | 7/1983 | Jackson et al. | 371/20 |
| 4,402,055 | 8/1983 | Lloyd et al. | 364/579 |
| 4,404,639 | 9/1983 | McGuire et al. | 364/579 X |
| 4,456,963 | 6/1984 | Wiggins | 364/571.01 X |
| 4,488,299 | 12/1984 | Fellhauer et al. | 371/20 |
| 4,630,224 | 12/1986 | Sollman | 364/550 |
| 4,642,636 | 2/1987 | Smith et al. | 364/571.01 X |
| 4,658,400 | 4/1987 | Brown et al. | 371/25 |
| 4,707,834 | 11/1987 | Frisch et al. | 371/20 |
| 4,714,995 | 12/1987 | Materna et al. | 364/200 |
| 4,727,475 | 2/1988 | Kiremidjian | 364/200 |
| 4,760,330 | 7/1988 | Lias | 324/73 |
| 4,796,206 | 1/1989 | Boscove et al. | 364/551.01 |
| 4,807,161 | 2/1989 | Comfort et al. | 364/550 |
| 4,821,217 | 4/1989 | Jackson et al. | 364/551.01 |
| 4,841,456 | 6/1989 | Hogan, Jr. et al. | 364/550 |
| 4,843,575 | 6/1989 | Crane | 364/551.01 X |
| 4,870,347 | 9/1989 | Cicerone | 324/158 R X |

Primary Examiner—Joseph L. Dixon
Attorney, Agent, or Firm—Ronald M. Goldman; Benjamin DeWitt

[57] ABSTRACT

A modular automated test station permits a plurality of tests to be performed under program control on complex electronic assemblies such as avionics equipment and provides for calibration. Interactive prompts are displayed enabling test personnel with minimal training to operate the test station and perform the tests. Particular kinds of test instrumentation together with the associated software program may be removed or replaced by other instrumentation and software to adapt the test station to test of another kind of equipment. A group of test stations forms a part of an assembly line in which information may be shared among test stations and with remote databases. The test stations are arranged in groups with one test station in the group containing a processor that is shared with other stations in the group and with each test station containing an assigned processor with the assigned processors being permitted to communicate with the shared processor. The shared processor may also communicate with remote databases.

29 Claims, 10 Drawing Sheets

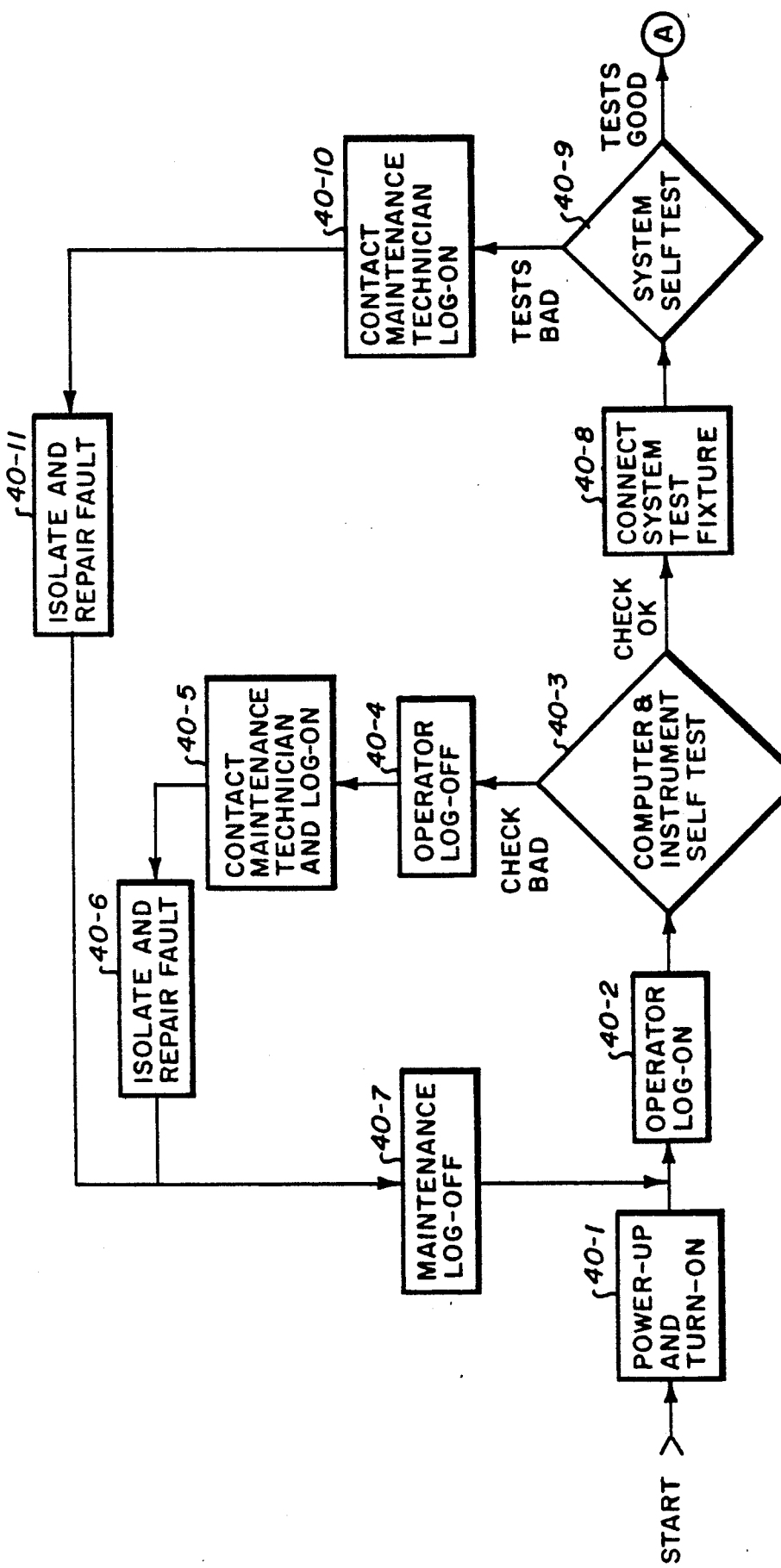
Fig_2a

MODULAR AUTOMATED AVIONICS TEST SYSTEM

FIELD OF THE INVENTION

This invention relates to integrated diagnostic and test systems for complex electronic equipment and, more particularly, to modular test workstations useful for testing electronic avionics equipment both in the factory during production and in the field for maintenance and repair.

BACKGROUND

Electronic Avionics Equipment is an inseparable and necessary part of modern aircraft. Complex electronic system equipment of that type, for example, is used in radar systems that determine proximity to other aircraft or weather patterns; is used in electronic navigation systems, such as the "Loran" system, through which the aircraft position in travel may be monitored; and is used in electronic countermeasures systems, familiar in military aircraft, through which radar guided missiles may be electronically confused and diverted to shield the aircraft from harm. A characteristic of avionics equipment is that it contains many types of electronic circuits: Like most modern electronic equipment it includes digital type circuits, such as microprocessors and other computerized controllers, analogue type circuits for processing analogue signals, and RF circuits, microwave energy transmitting and/or receiving stages.

The manufacture of such modern electronic equipment involves many aspects of testing to ensure operability. Given the design of a circuit, the apparatus is assembled from electrical and mechanical components in a step by step procedure and is tested; finally being packaged in a metal container with accessible electrical connectors for connection to other systems. For example typical equipment contains one or more printed circuit boards or printed wiring board assemblies, PWBA's, as variously termed, containing sockets and inter-component connections. Electrical components such as resistors, capacitors, electrical connectors, RF oscillators, power supplies and especially a large number of integrated circuit chips are mounted to the PWBA's. Two or more of such PWBA's are often assembled into a common unit, forming a "module", that is thus of greater complexity. In turn the module is often connected with other modules, to form a system or "unit", and the unit provides even greater complexity.

To assure that the equipment functions prior to delivery to the customer considerable quality control is given to the product at the factory during production. In high quality electronic systems of the kind used in industry and the military, particularly in aircraft, testing is a necessary part of the manufacturing process and is accomplished at many stages of production. The bare PWBA's are tested; when the PWBA is "stuffed" with the electronic components, the board assembly or module is tested; and when the system is assembled from the modules, the overall system is tested. When the system is installed in its intended site, for example in an aircraft, the system is again tested, assuring performance.

As those skilled in the art appreciate testing complex electronic devices is a difficult process. In a digital circuit it involves determining whether many of thousands of functions are in fact performed and in an analogue circuit it involves determining margins and ranges of operation to complicated specifications; totally unlike switching on a light switch to see if a light bulb lights up. Beyond the manufacture and delivery, the avionics system must be tested upon installation, such as following installation in an aircraft. And thereafter the equipment must be maintained; tested occasionally to determine whether the installed equipment is performing to specification. If not, the reason for the insufficiency must be diagnosed and the necessary repair made.

A large customer of complex electronic equipment, the U.S. military as example, may procure like kinds of electronic systems from many different sources. A radar system may be purchased from one company, an electronic countermeasures system from another and a navigation system from still another manufacturer. Each of those electronic systems typically contains an RF section, a digital section and an analog section; although such electronic equipment is of like kind in a generic sense they are not identical and are not the same in a specific sense. To test the product procured from one such company test equipment must also be designed and purchased from that company which is specialized to that company's product, if customer maintenance and repair is to be sustained. Even though such specialized test equipment may contain some "off the shelf", standard, test equipment, that off the shelf equipment is modified with adapters and the like and is supplied as a test set to fit the particular test situation.

As a practical matter the one manufacturer's test set cannot be conveniently adapted for test of the product of the second manufacturer. For each such system, the customer must purchase another test set as is the present practice. Moreover the situation that exists for products purchased from different manufacturers also applies to different electronic systems purchased from the same manufacturer, as is also the present practice. The clutter of electronics test sets at customer test facilities is often awesome Quite frequently the test set that the customer requires to maintain a given electronic system is the same test set that is used by the equipment seller's factory personnel Often the supply of a copy of the factory's test set is regarded as a cost saving measure to avoid redesign. Additional copies of the factory test sets are procured, fabricated and supplied to the customer as separate items Recognizing that the factory testing is usually more thorough and involves some kinds of tests not usually contemplated for maintenance in the field, the test set may contain more equipment and/or features than is needed, reducing the sought after cost savings. Procuring copies nonetheless remains the easiest and quickest way to obtain test sets prior to the present invention.

Although seemingly simple in concept in present practice such customer based testing efforts thus involves enormous difficulty and commitment of resources and presents unfortunate delays, involving authoring and specification of technical manuals, testing procedures, training of personnel to do the training and the design and construction of test sets with which to perform the testing Unlike the modern "throwaway" society of small inexpensively produced in high volume appliances in which when the appliance fails, it may be discarded, not repaired, and a replacement purchased, complex electronic equipment of this kind must be maintained and repaired.

An important part of test set procurement at present is the authorizing of a test document that explains the test set, the tests and the procedures for performing the tests for the customer's personnel. The cost of such documents is significant.

A real difficulty in the maintenance practice lies not only in the generation of paperwork, but in training test personnel. It is one thing for the test sets to be used by factory and operations testing personnel who built the equipment from the ground up and who used that test equipment throughout production with much of the "know how" on the test set residing only in the cranial regions of the particular factory personnel; and another totally different matter when the test set is handed to a newly inducted Air Force airman together with a 20,000 page document on the test set. However intelligent and well intentioned the airman may be, the task laid before the person is indeed formidable, if not overwhelming. As the present practice continues the delay and cost of training the customers personnel can only worsen.

With modern avionics systems, the testing technology transfer time is effectively measured in years, not months or weeks. As electronic systems become even more complex, the unfortunate trend, should present maintenance practices continue, is that the transfer of testing capability will take many more years and perhaps swallow the customers resources, dwarfing the cost of the original system installed. That is not a desirable end for advancing technology. Fortunately, the present invention changes the practice, breaks that trend and presents a new capability with which technical personnel may be trained and testing of complex electronic devices may be accomplished more efficiently.

One obvious solution to the customer's existing dilemma is to return all electronics system equipment to the factory and allow the experienced factory personnel to perform the tests. Often this is not a practical approach. Given completion of a complex system, the factory moves its personnel to new tasks and are not readily available; few customers are willing to pay for the factory to maintain personnel dedicated to that purpose. In other situations the customer requires self assurance that its required maintenance is given the priority that it dictates by having technical personnel, its own employees, at its beck and call, at any place in the world where that customer's avionics equipment may be located. In the case of military equipment the need for prompt, essentially on the spot kind of repair capability has been traditionally regarded as a necessity to military planners.

The pressure to reduce personnel training time and make testing more efficient is felt even at the factory level. By reducing the testing costs, the product may be produced at less expense and at a more predictable cost to the obvious benefit of both factory and customer alike. Should a new system be proposed to a potential customer to achieve new ends, the predicted cost is a factor in whetting the customers appetite or in dampening that appetite; the cost of testing is an integral part of the cost of the system initially. If the system cost is too high, then there is little business; if the cost is set too low the factory may incur a deficit and bankruptcy for the project. The present invention enhances the specification and accomplishment of testing in the factory environment.

Automatic test systems for testing electronic apparatus which incorporate computers and computer to computer communications systems and computerized testing have been previously explored by others. Reference to the patent literature identified herein provides additional background to the present invention: U.S. Pat. No. 4,658,400 granted Apr. 14, 1987 to Brown, et. al. for a WSI tester; U.S. Pat. No. 4,402,055 granted Aug. 30, 1983 to Lloyd, et. al. for an Automatic Test System Utilizing Interchangeable Test Devices; U.S. Pat. No. 4,760,330 granted July 26, 1988 to Lias for a Test System With Shared Test Instruments; U.S. Pat. No. 4,796,206 granted Jan. 3, 1989 to Bostove, et. al. for a computer assisted vehicle service featuring signature analysis and artificial intelligence; U.S. Pat. No. 4,707,834 granted Nov. 17, 1987 to Frisch et. al. for a computer based instrument system; U.S. Pat. No. 4,393,498 granted July 12, 1983 to Jackson et. al. for a Method and Apparatus for Testing Systems over Digital Buses by Transmitting and Receiving Signals in the Form of Standardized Multi-Bit Binary Encoded Words that uses a microcomputer adapted to test complex avionic line replaceable units; and U.S. Pat. No. 4,488,299 granted Dec. 11, 1984 to Fellhauer et. al. that presents a computerized test system for electrical Circuits.

The use of computer to computer communications for transfering test programs and data is known. Related computer systems are known in which common or shared data is to be maintained at a plurality of different computers at distinct locations in which the shared data may be entered at the one authorized location that effectively "owns" the particular information and then is automatically distributed in due course, not in real time, to update the data at each of the remote locations, are known. One such system is described in U.S. Pat. No. 4,714,995 to Materna, et. al. granted Dec. 22, 1987, assigned to the assignee of the present invention. In the Materna patent the computer systems may contain the information to be updated in databases having different formats. Nonetheless associated translating apparatus tailors the format to each respective database and the digital information is sent in proper form. Moreover at the remote location an operator may inquire of the "owning" computer for the particular data and date of last update to ensure that the latest data is on hand at the remote location before undertaking any action locally based on the information. The present invention incorporates aspects of such computer to computer communications.

An object of the present invention is to minimize the training required for technicians who must maintain such systems; to relieve that person of the burden of reading and memorizing so much information by placing that burden within modern computers and to reduce the cost of and enhance the efficiency in maintenance of complex electronic equipment.

A further object of the invention is to provide an integrated modular diagnostic and test work station of universal application, capable of use with many different kinds of electronic equipment and capable of testing digital, analog and RF circuits in electronic equipment.

An additional object is to provide intelligent test workstations that assist and ease the diagnostic burden on factory test personnel and on field technicians.

A still further object of the invention is to provide a more reliable and expeditious means of transferring technical knowledge relating to repair and testing of complex electronic equipment from the factory to the field.

A still additional object is to insure accuracy of measured results by providing for an automatic calibration and normalization of the test equipment and associated circuits.

Another object of the invention is to provide an improved manufacturing system in which test stations may incorporate smaller capacity computers for controlling testing while sharing a larger capacity computer that libraries large volumes of programs and information and functions as the focal point for interfacing with the main factory computer and in which test backup to failure of a given test station is provided by a capability hierarchy arrangement between the various test stations and test cells.

SUMMARY

In accordance with the foregoing objects, a versatile test set contains electronic testers for testing multiple kinds of electronic circuits of an electronic apparatus to which the testers are connected by a fixture connector, including testing of digital circuits, analog circuits and/or RF circuits. The electronic testers are under control of a programmed computer, the test controller processor, which controls the testers and receives and analyzes and displays the result, permitting rapid diagnose and repair of complex electronic equipment. The electronic testers are modularized within the test set and may be individually inserted or deleted from the set together with the associated corresponding software module to change the test set capability. The set may be adapted to test different electronic systems by changing the software modules and the test fixtures, preserving intact and re-using the major hardware.

The test set allows for calibration and normalization to permit the electrical characteristics of the measuring circuit to be isolated from the characteristics of the unit under test. By replacing the unit under test with a load device such as a connector to connect inputs and outputs of the stimulus and response test instruments and performing the test, the electrical characteristics of the test instruments the interface, the adaptors, the associated cables and the like elements in the measurement circuit are isolated and determined apart from the characteristics of the unit under test which serves as normalization information. Means are provided to store the normalization information and to substract that information from the test measurements obtained by performing the tests with the unit under test installed, with the difference representing the units performance measurements and means are provided to store such test results.

In a manufacturing system a group of test sets may be coupled in a network or cell to perform tests appropriate to a manufacturing stage, such as printed wiring board assembly, sharing access to a common computer, a test cell controller and the test sets in that test cell may also be separately networked through the test cell controller to other test cells, to a manufacturing or factory database and/or to remote test sets located in the field.

With a test set of universal application which the disclosed invention provides the customer is equipped to handle test of equipment that has all three types of circuits; hence, the customer can also test other equipment that may have only one or two types of electronics circuits. Other types of testing equipment may be substituted for that in a given embodiment by changing the equipment and the associated "driver" software. Ideally the hardware may remain the same and only the software needs to be changed.

Present off the shelf test instrumentation has been at the point in technology at which such test instrument comes equipped for computer control of test implementation. Thus frequency measurement equipment, signal generators, spectrum analyzers and the like which are of universal application are provided with the standard IEEE connector for attachment to a programmed computer, the processor controller. By having a programmed computer issue instructions to the test equipment the measurements may be taken and the result returned to the computer. The present invention incorporates such equipment to advantage. Fully programmed tests are easily accomplished; the test operator does not need to fumble with a large number of switches or knobs; the test operator has the prescribed tests programmed in advance and need only watch the accomplishment of the test on a display monitor. Even isolation of faulty digital equipment may be accomplished automatically. And in fault isolation of defective RF equipment, the operator is guided by computer prompts to place the RF probe and take measurements, the interpretation of which derived data is given by the computer to isolate the faulty part.

The present invention adapts such kinds of equipment into a fully integrated assembly or work station. An additional feature of the present invention is that the prescribed programming for spectrum analyzers and the like is preordained for the test operator by the original factory engineers and the test technician in the field need not reinvent the steps or attempt to implement them from a printed test procedure document. The program and data information can be sent from a remote computer containing the program and data "masters". This lessens the skills required of the test technician and enables the technician to implement a test quickly.

The foregoing and additional objects and advantages of the invention together with the structure characteristic thereof, which was only briefly summarized in the foregoing passages, becomes more apparent to those skilled in the art upon reading the detailed description of a preferred embodiment, including the description provided in the appended claims, which follows in this specification, taken together with the illustrations thereof presented in the accompanying drawings.

BRIEF DESCRIPTION OF THE DRAWINGS

In the Drawings:

FIGS. 2a through 2c are flow charts illustrating the operation of the system;

FIG. 4b is a diagram showing the logical networking of the various test stations employed in the manufacturing process of FIG. 4a while

DETAILED DESCRIPTION

Figure 1:
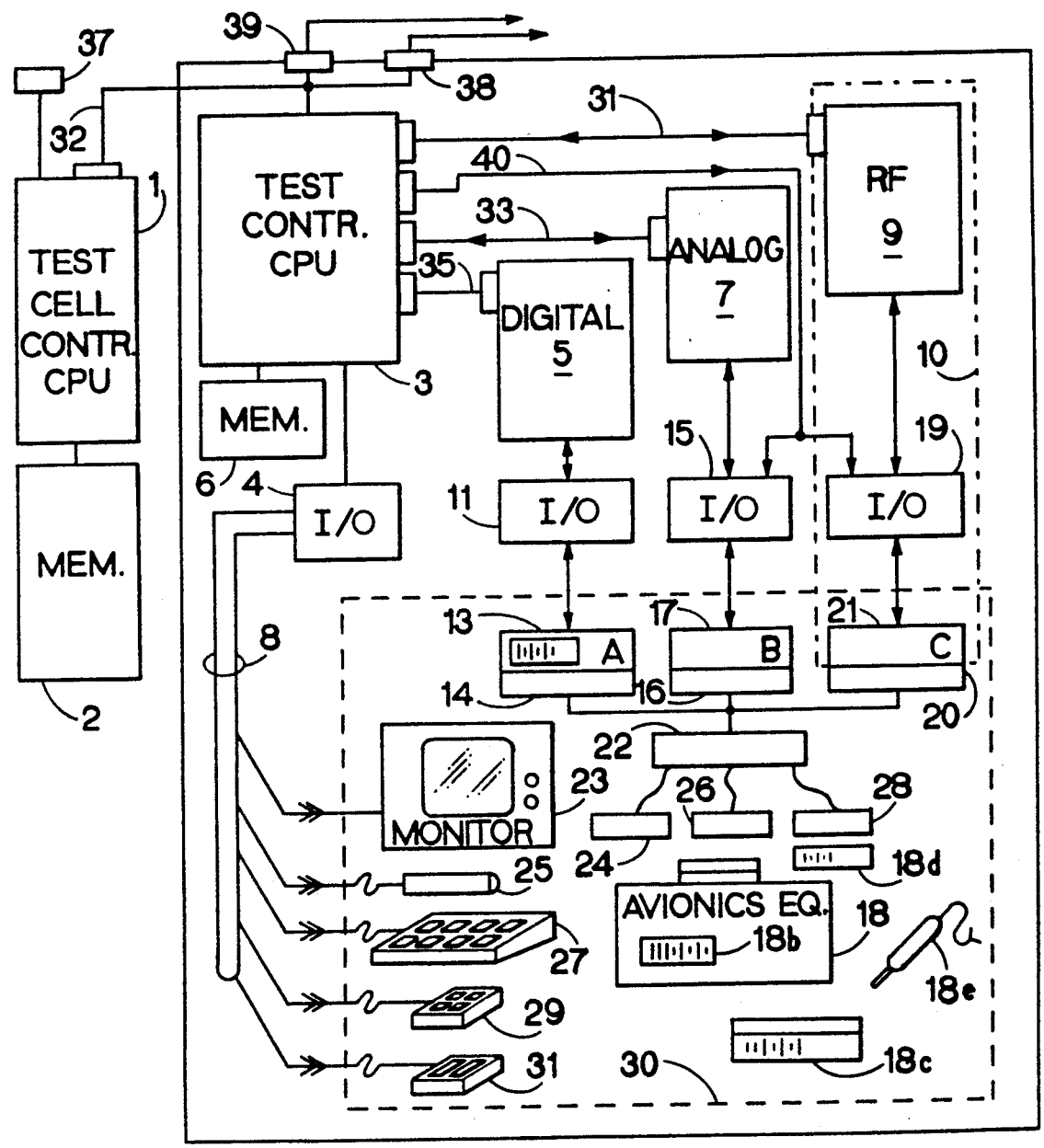
FIG. 1 illustrates in block diagram form an embodiment of the invention.

A preferred embodiment of the modular automated avionics test station and an associated controller is illustrated in block diagram form in FIG. 1 to which reference is made. A main computer 1, referred to as a test cell controller, with an associated memory 2 that contains the programs or "software modules" later described, is coupled to the test station, defined by the formed rectangle. The test station contains a computer 3, referred to as a test controller, and a test subsystem rack, containing various kinds of test instrument modules, including a digital test subsystem 5, an analog test subsystem 7, and an RF test subsystem 9. For convenience a test subsystem may herein often be referred to simply as a "tester". The test controller contains in memory 6 the computer's operating system test executive, instrument drivers, data logger, test language compilers, user I/O process, network process, and debug tools, which preferably are software programs.

Test controller 3 is coupled to the test cell controller via cable 32 to provide for transfer of information. Each of controllers 1 and 3 are suitably programmed computers or processors of conventional structure. Test controller 3 contains conventional input output (I/O) circuits 4 to couple the controller via electrical cable 8 to peripheral input and output devices, including a graphics monitor 23, bar code reader 25, keyboard 27, keypad 29 and mouse thirty one, the controller incorporating suitable software drivers supplied by the manufacturers of those devices which are known in the art. These peripheral devices described and the test fixtures elsewhere herein identified are located at a convenient physical panel or desk and provide the "user interface" to the test station, represented by the dash lines 30.

Digital tester 5 includes an input output interface 11 and connector 13 which is coupled to a test adapter or "fixture" 14; analog tester 7 includes an input output interface 15 and connector 17 coupled to a test adapter 16; and RF tester 9 includes an input output interface 19 and connector 21 coupled to a test adapter 20. Each of interface 15 and interface 19 includes switches, not illustrated, to route signals to a proper location. Each of the described inputs and outputs is coupled to the associated tester and serves as the channel or signal path from which output vectors or signals from the test equipment is transmitted to the fixture from which it is passed to the equipment being tested, such as the avionics equipment 18 pictorially illustrated, and to provide also the return path with which the responses from the tested equipment is presented to the test equipment for measurement and analysis.

Each of the testers is modular as indicated by the dash line 10 surrounding the RF tester; that is, the test equipment and its associated elements as shown may be disconnected and removed from the rack, indicated by the line surrounding the station, without affecting the operation of the test station with respect to tests performed by the remaining testers. Hence the test station may be used with one or more of such test equipment modules.

A test adapter or fixture, including elements 14, 16, 20, 22, 24, 26 and 28, permits each of the test modules to be connected in circuit with an assembly to be tested. The electrical leads stemming through adapters 14, 16 and 20 are connected by electrical leads to a main adapter 22. Some of the leads from the digital tester may be placed in electrical parallel circuit with the leads from the analogue tester in as much as the two testers are not operated simultaneously, although the circuits from the RF tester will be maintained with separate connections. Stemming from the main adapter 22 and wired to appropriate leads therein are a plurality of different size connectors, represented as 24, 26, and 28. These connectors permit connecting the testers in circuit with any of the equipment to be placed under test, whether a PWBA, a module and/or a unit, which as is common have different size edge connectors. Connectors 14, 16, 20, 22, 24, 26 and 28 include a bar code label attached to the outer surface. This permits a scan of the bar code of the adapter, to which the unit under test has been connected, to verify that the unit under test has been connected to the correct connector.

Electrical cables extend between test controller 3 and the associated testers: Cable 31 couples an input/output circuit of the controller to RF tester 9; Cable 33 couples another input/output circuit to tester 7; and cable 35 couples still another input/output circuit to tester 5. In practice cables 31 and 33 are suitably fitted with standard IEEE 488 connectors to interface with like connectors on the computer and the test equipment and the cables form the conventional IEEE 448 "bus" for digital signals. Cable 35 is any high speed digital bus; its structure need not conform to the slower characteristics of the IEEE standard although the IEEE standard may be used if desired. The three cables serve to couple digital signals between test controller 3 and the test equipment and vice-versa as hereafter is described in greater detail with the particular circuits being individually "addressable" by test controller 3. A fourth IEEE bus cable 40 is coupled between test controller 3 and output switches 15 and 19, which are computer addressable configurable switches as later explained in greater detail.

A connector 37 is provided to couple test cell controller 1, via an input/output circuit therein to the factory communication network by an appropriate communication line over which computer to computer communication is possible. A connector 39 is provided to connect test controller 3 via an input/output circuit therein to a separate test network, which are better illustrated and described elsewhere in this specification. And a third connector 38 provides a connection to an associated programmer station that has access to the test station by the same test network.

Test cell controller 1 is a computer processor that supports and controls the operation of the test workcell. It is multi-functional and multi-user capable processor. Suitable computers for this purpose include that marketed currently as the "Micro Vax II" sold by the Digital Equipment Co. of Maynard, Mass. The test cell controller serves various functions in the test station: Conventional file transfer, file server, data collection, data analysis, system management, post processing, test program generation, communications and as a file storage center for the test program sets, fault diagnostics, rework instructions and process data are some of the functions performed.

A streamer tape storage device, not illustrated, is preferably included within test cell controller 1 as a back up memory to back up the information in memory. The test cell controller may thus serve the file serving activities for the entire test workcell as well as for the modular test station. Programs are maintained, backed up, and updated at this one central location and not throughout the entire test workcell.

At this juncture in the description of the preferred test station, mention may be made of the networking of related test stations of the structure described. When a group of test stations are to perform a related group of tests and are located near one another, as given later in this specification, it is not necessary for such stations to include another test cell controller. The test cell controller is intended to be large enough to serve additional test stations, usually as part of an affinity group in factory assembly procedures. Hence, the test cell controller is coupled to the test network earlier described and communicates not only with the test controller 3 in the illustrated test station, but also with the corresponding test controllers in the associated test stations. This arrangement has obvious cost advantages.

The test cell controller thus may be mounted near or even within the test set and that controller interfaces with the modular automatic avionics test set of FIG. 1, abbreviated MAATS, by a private test network, via connection 39, that conforms to known Ethernet standards. Test cell controller 1 also interfaces with the remainder of the factory by a separate channel or bus that conforms to the Ethernet/Decnet standards via connector 37. The two networks are as illustrated logically separate, but physically use the same transmission line; and therefore are compatible. This multi network use of a transmission line is accomplished with a LAN bridge, a known device that is elsewhere described in greater detail.

Most test instrumentation available "off the shelf" is presently adapted for remote computer control of the instrument; that is the instrument includes a processor or other decoder and may receive instructions in the form of digital signals from a remote computer and perform the tests specified in the instructions. Typically the test instrument manufacturer provides the command instructions to the customer as "software" and the customer may use those instructions in a sequence, a program, executed by the controlling computer. The signals are sent between the test instruments and the controlling computer by a standard IEEE interface which is included in the test instruments supplied.

It is that kind of "programmable" test instrument which are incorporated in the testers forming part of the present test station, particularly the analog tester 7 and the RF tester 9. To the extent that any particular test instrument is not so programmable, it is necessary to design and incorporate such additional circuits within the particular test instrument so that, as thus modified, the instrument is programmable.

The test instrumentation software is incorporated within the test controller in memory and is called up and is to be executed as part of the operating program. This same software is also placed in memory in test cell controller 1 as more particularly described in this specification.

The particular testers are considered in further detail beginning with the Digital Functional Tester. Digital Function Tester 5 is coupled through an interface or fixture 13 to the edge card connector of the unit under test generally depicted as avionics equipment 18 in the lower right side of the figure. Under control of test controller 3, the digital function tester applies a preprogrammed sequence of digital signals through the interface and checks the response outputted by the circuit; the output being coupled back into the tester. Suitably the input output connector is of the type that contains at least four hundred pins, and may be expandible to five hundred and twelve pins. It is noted that many units under test contain extensive built in test circuitry to aid in the identification of faulty printed wiring board assemblies, line replaceable modules and line replaceable units that is accessed through the connector.

By way of example a specific embodiment of the digital function tester may have at least a 20 MHz data exchange rate through the fixture to allow fast testing, and a clock capable of operating in synchronism with the unit under test, 80 MHz by way of example. A D/R slew rate greater than 500 v/microsecond with maximum overshoot terminated; a D/R pin to pin skew of less than 5 nanoseconds, digital pin input impedance greater than 90 kOhms and output impedance of 10 ohms or less; a channel bandwidth, the frequency range of the "digital pin" in the DC to 20 MHz range; a drive to receive setup time, the time it takes to inhibit the driver of a particular pin, allow for driver settling and receive valid unit under test response data, of 5 nanoseconds or less. The number of "control edges per test cycle" may be 10 nseconds or less; the "edge placement" of 5 nseconds or less.

The digital function tester should be able to produce at a minimum three types of data formats, denominated R0, R1 and NRZ. It should handle all logic families with software reconfigurable levels that range from $-12$ volts to $+12$ volts at a minimum. At least four 16 K buffer memories in the test controller are located "behind" the pin used, respectively for stimulus, inhibit, expected response and mask data. Once loaded by the test controller its buffers allow the pin to operate autonomously of other processing. The pin memory depth may be at least $16k \times 4$.

As those skilled in the art appreciate, the digital tester is capable of working with many different kinds of digital circuits in the units under test.

Analog tester 7 incorporates measurement equipment and takes the measurements under computer control through the fixture. For that purpose the fixture contains adequate number of pins dedicated to this purpose, suitably a minimum of sixty four pins to ensure adequate versatility. Alternatively the fixture pins may be combined with the "digital" pins to which digital tester 5 is connected, since the analog and digital testers are not used simultaneously. The analog pin suitably should handle frequencies through 10 MHz so as not to introduce impedance mismatch or signal losses into the system.

By way of example the analog tester measures DC voltage, in the plus or minus 100 vdc range with 0.05% accuracy; AC voltage, suitably from $-250$ to $+250$ VAC and 0.05% accuracy; DC current, suitably through 2 amps; resistance, suitably from 0-20 MOhms, frequency; pulse width; rise and fall times; over shoot, suitably in the mVolt range. As those skilled in the art appreciate the kind and type of test capability provided by the testers may be modified or changed within the scope of the present invention.

RF tester 9 is next considered. Of the various forms of test equipment available off the shelf the most complex is that for testing RF. The RF tester provides a variety of measurements and also provides the test vectors, the stimulus, to the RF circuits under test and monitors the result, the signature.

RF tester 9 measures gain and insertion loss, suitably to an accuracy of + or $-0.05$ dB; gain variation as a function of frequency; phase variation as a function of frequency; group delay, VSWR; intermodulation distortion, noise level. And the tester includes "third order intercept", a tuning settling time of 10 microseconds or less, and a group delay accuracy of plus or minus 0.1 degree.

Other instruments within the RF tester include those for providing a spectral analysis, scalar/network analysis, frequency measurements. The system is capable of performing spectral analysis from 100 Hz to 20 Ghz. The capabilities include, but are not limited to harmonic and non-harmonic distortion, absolute and relative frequency measurements and absolute and relative amplitude measurements. The system is capable of performing scalar network analysis from 50 Mhz to 20 Ghz. The capabilities include, but are not limited to transmission loss and gain characteristics, magnitude and phase characteristics, S-parameters and time domain characteristics. The system is capable of performing frequency measurement from 10 Mhz to 20 Ghz with a resolution of one Hz.

RF stimulus is provided through the RF Unit Under Test interface or adapter 21. By way of example RF in frequency range of 10 MHz to 20 Ghz, −120 to +20 dbm power output; harmonics of <40 dBc; start stop frequency ranges of 10 Mhz to 20 Ghz, essentially full range; resolution 5 Hz max; external PM pulse width of 50 nanosec minimum and two modulation generators each with PM on/off ratio of >80 dB; rise/fall time of <25 n sec; minimum pulse width <100 nsec; pulse repetition rate of 100 Hz to 5 Mhz; AM frequencies of 1 KHz with 10 KHz external; AM percent of 10 to 90%; AM bandwidth >100 kHz at the 3 dB points; AM distortion of <10%; FM rates of 50 kHz to 10 MHz; and FM peak deviation of 5X modulation rate minimum.

Though represented as a single module in FIG. 1, the RF tester typically comprises a plurality of separate instruments which are individually rack mounted and connected to the IEEE connector, have associated separate software and are individually bus addressable by the computer. The RF stimulus generator is intended to be quite versatile and cover all available needs. Ideally this would be obtained in a single off the shelf apparatus as represented by the block in the figure. As a practical matter that range of available values may be available at present by combining two or more different off the shelf units in which case each of the units is connected separately to the processor controller and the appropriate software modules for each are included in the database. The controller in that event as part of the program determines which of the RF sources is to provide a particular stimulus as required. These various sources and instruments are selectively routed through the input-output, a configurable switch as later described in FIG. 1b.

Special function generator suitably is capable of simulating JTIDS, BPSK, QPSK, QAM, PCM, AM, PM, AND FM signals independently or simultaneously; provides pseudo random jitter, broadband radar chirps, antenna scan modulation and phase continuous frequency hopping.

Input-output 19 is a configurable switch which is addressable and is controlled by the computer. The switch suitably may contain four ports for stimulus type signals, that is signals of the kind supplied by signal generators, six ports for connecting response type apparatus, that is test measurement equipment like power meters and noise meters, and contains relay type electromechanical contacts for connecting inputs to outputs on a selective basis, that is configured, as determined by the computer. Ideally the electrical paths through the switch are broad band, preferably operable over 10 Megahertz to 20 Gigahertz.

Figure 1B:
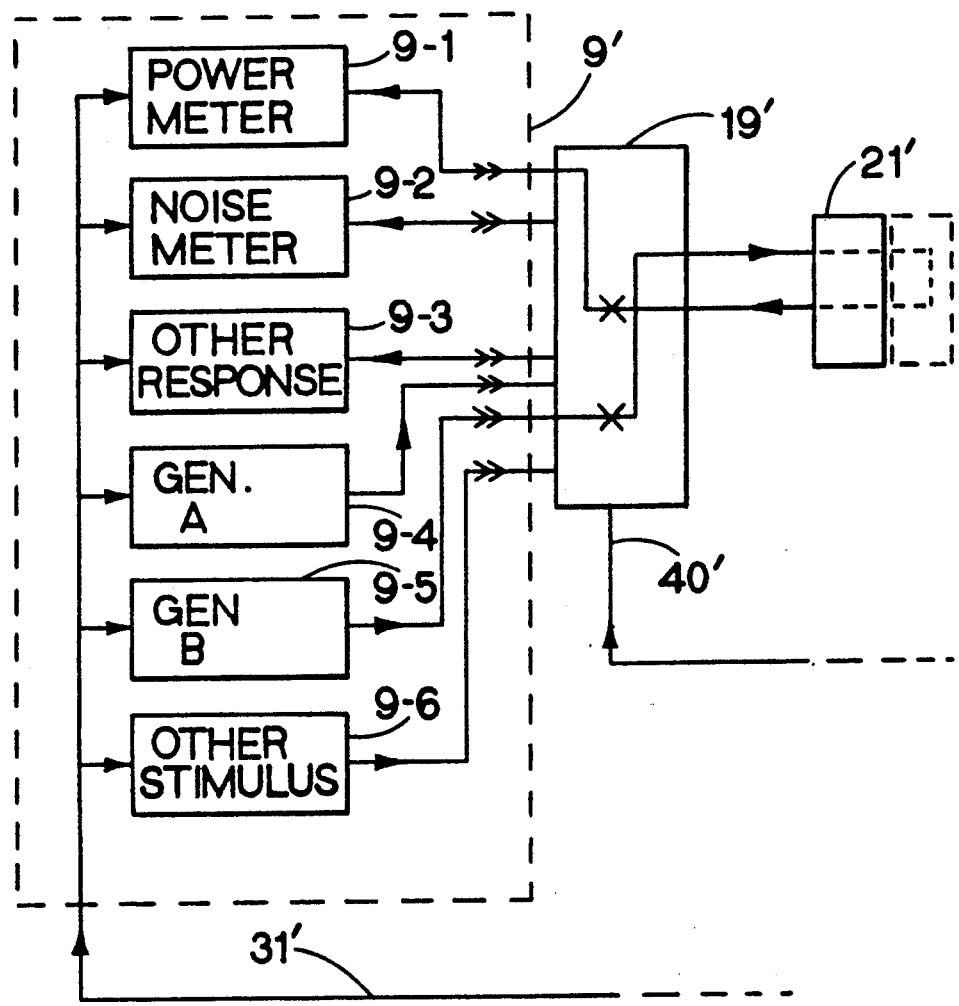
FIG. 1b illustrates in block diagram form a more detailed depiction of an RF tester used in the embodiment of FIG. 1.

Thus in FIG. 1b the RF tester is illustrated in block diagram form with the elements identified by the same numeral primed. With block 9', there are included various equipment for supplying "stimulus" type signals, such as "GEN.A", 9-4, and "GEN.B", 9-5, representing signal generators of two separate ranges and other stimulus generating equipment, 9-6, and measuring equipment, such as the noise meter, 9-2, and the power meter, 9-1, and other response measuring instrument, 9-3. As illustrated the computer has via IEEE bus 40' configured switch 19' for one test, coupling the signal generator through to the unit under test and coupling the output of the circuit under test to the power meter. The configureable switch is essentially a re-configurable interface input output device, the generator serves as a stimulus generator that provides stimulus signal, and the power meter serves as a response measuring instrument to measure the signature and provide the test result.

Via IEEE bus 31' the computer subsequently initiates operation of the signal generator to provide the stimulus; the response measured at the power meter is sent via the IEEE bus back to the computer, where the response is analyzed. The foregoing is typical. Other configurations may be established. What is illustrated for the RF circuit is also the structure for the analogue tester 7 of figure 1 and need not be separately described in detail.

Although the foregoing description addresses off the shelf test equipment to perform desired RF tests, it is recognized that RF measuring or test circuits may be required that are unique and is required to be fabricated. Such special test gear would be designed to be computer controlled and contain a suitable IEEE standard connection. The designer would also provide the software, the instructions to command the instrument to issue a test. Hence that equipment may be fitted within the test station as simply another module.

The patch panel is a front panel on the tester, not illustrated, in which all stimulus and response instruments interface to the unit under test (UUT). Interconnect between the instruments and the UUT is performed via the switch matrix. The operator has an option on disconnecting a patch cable on the front of the patch panel to gain access directly to various instruments for high precision measurements.

The detectors and power sensors are networked into the switch matrix to prevent the operator from connecting and disconnecting sensors unnecessarily and to increase the automation of the RF test.

The system is capable of performing self test and calibration on the entire network, including instruments, computers, cables and switch network. The self test function is capable of finding and reporting malfunctions while the calibration function characterizes, stores and corrects system anomalies such as variations over frequency.

The foregoing programs form essentially software modules, which can be copied and distributed from the factory to the field on magnetic disks, compact optical disks, semiconductor read only memory or any other form of memory media. In the novel systems described, it is transferred from one computer to another by communications networks as is described in this specification. Though not illustrated in the figures, any of the memory reading devices such as a floppy disk or CD ROM read in apparatus or the like can be coupled to any of the computers used in the system through a conventional input interface device and included as part of the combination, which is within the scope of the present invention.

Databases maintained on the computer as described are conveniently named to identify their function in the system. Thus given a particular fault as represented by a signature, the response to running a test, may be regarded as a fault dictionary; given the signature, the signature may be "looked up" in the electronic fault dictionary and an answer given. Likewise a record of the kinds and types of repairs made to equipment may be regarded as a repair record and a database containing a compilation of equipment specifications is regarded as a specification compilation.

The digital simulation software for running tests of digital equipment is a known kind. Typically as part of a design for a digital circuit, the design engineer runs a simulation program to determine the validity of the design, establishing a series of digital outputs which result from specified digital inputs and determining if any unprovided for output results. With the design validated in that manner, the engineer also runs simulations to cover the "what if" specimens, the outputs which occur when one or more components or circuits in the particular design fail. Typically this information is maintained by the factory on an Engineering Database located in a separate computer, which as described later in this specification is accessed by the test station. This "fault dictionary" is useful in testing the circuit in production.

With a large or complex circuit, a large tabulation results and, when used like a dictionary, given the input and the output one may "look up" a likely cause or causes of the fault. This output may be tabulated either in printed form or maintained in a database in computer memory for convenient look up as needed. Thus in the testing procedure for a failed digital circuit a series of digital input signals, generically termed test "vectors", may be applied to a digital circuit and the output, generically termed the "signature" is given. With this signature the fault may be looked up by another "look up" program to list possible causes and those possible causes are then displayed to the test operator, either on the monitor or as a print out. This same relationship is described for each of the analog tests and the RF tests that are performed.

The tester supplies operating power to the apparatus under test. The various test "vectors" described in the software program are supplied and measurements are made and logged into the appropriate data base; they are then compared to the specification for the unit. If any are out of range, the fact is duly noted in the data base. With the compilation so made as symptoms the likely cause is found by comparing the symptoms to those in the appropriate analog or RF fault dictionary. As in other cases the fault dictionary is a data base originating with the engineer or other designers based on their experience and judgment with like kinds of equipment. A report is then issued.

In operation with all power sources, not illustrated, supplying current, the system presents an initial message to the test operator that is displayed on monitor 23, such as an invitation to run a test. To do so the operator must connect the equipment to be tested, such as the avionics equipment 18 illustrated in FIG. 1 to the appropriate fixture 24, 26, or 28 with which the equipments edge connector mates to complete electrical connections therethrough to the test equipment. The operators badge or other authorization card contains his authorization in bar code form. Moving the bar code reader 25 across the label, the operator's code is entered into the test controller 3, which checks the authorization and outputs another message on the monitor requesting the person to log in the particular apparatus under test. Moving the wand across the label 18b the equipment is identified to the test computer, both in kind and specifically by the equipments own unique assigned serial number. The test computer responds with that information as is later represented in FIG. 2c and prompts the operator to press one of the keys on keypad 31.

Figure 2B:
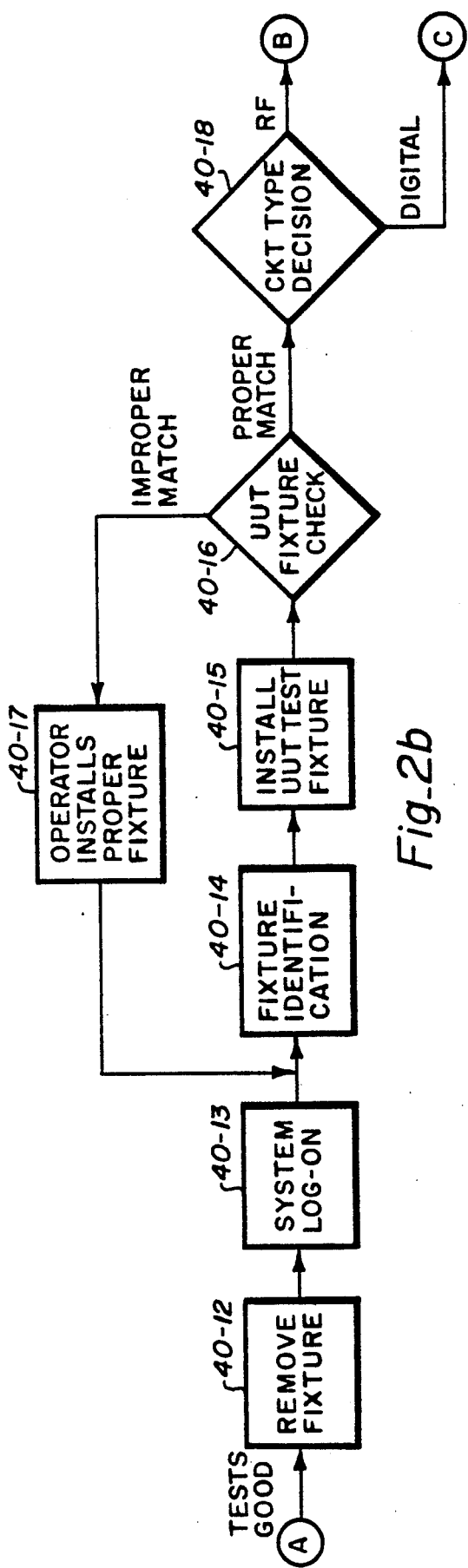
Figure 2C:
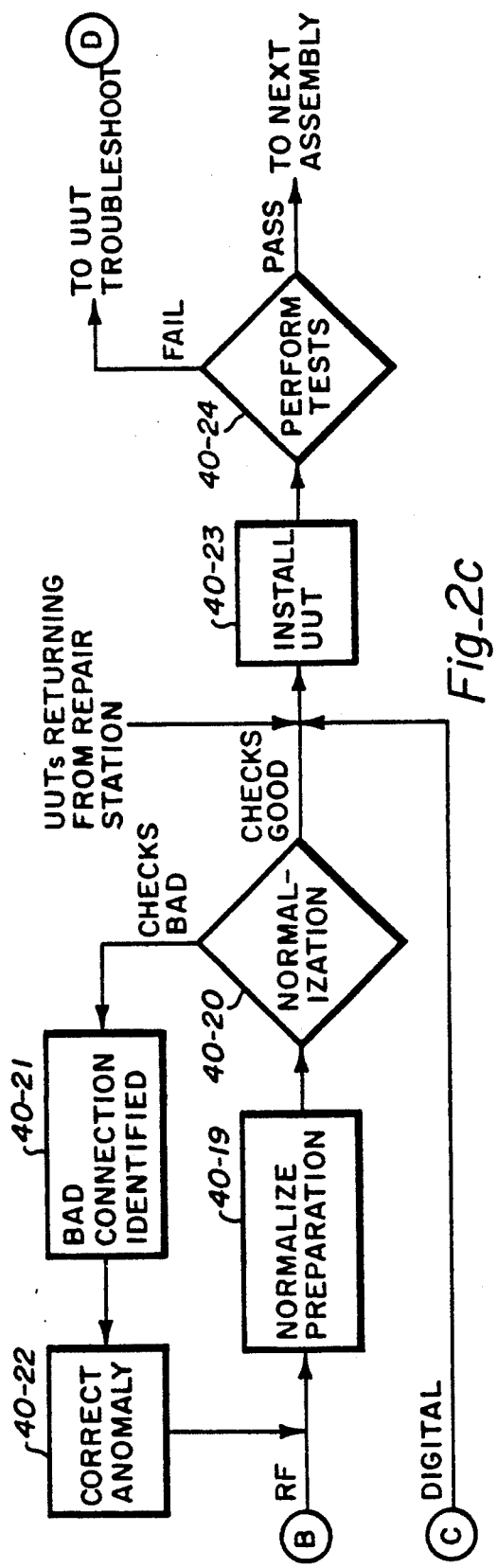

FIGS. 2a, 2b, 2c, & 2d present flow charts that serve to define the operation of the test station and the tests carried out. Turning first to FIG. 2a, power is switched on to the test station as represented at block 40-1. Block 40-2 represents test operator log on. The test operator uses the bar code reader and scans his authorization badge, which contains in bar code form the operators identity and authorization level. Upon verification the system displays a maintenance menu and instructions for the operator on the monitor, and the operator proceeds. The test controller initiates a self test of itself and the test instruments to ensure that the test station is functioning as represented in the decisional block 40-3. Typically all modern test equipment has a built in test cycle and performs that cycle when the equipment is first energized, and indicates the result.

If self test is for any reason negative, the operator logs off the system as represented in block 40-4 and alerts repair personnel who then log on as at block 40-5, repair the fault as at 40-6 and then log off, as at block 40-7, turning the station back to the test operator to start over. As elsewhere herein described, the shutdown of any one test station in a factory assembly system does not necessarily halt production; testing can be moved to another test station.

Assuming that the self test in decisional block 40-3 is positive, the program then proceeds to prompt the test operator to install the system test fixture, earlier identified in FIG. 1 as element 18c as at block 40-8. At this juncture, the operator connects a special test fixture 18c, to the output connectors 13, 17 and 21 described in figure 1, which connects all of the tester inputs and outputs to allow for system self test. This is essentially a calibration test of the test instruments and associated cabling through to the connectors.

The operator installs the proper cables, electrical loads, couplers and the like from the fixture to the tester in accordance with the instructions displayed by the monitor at that time. Following installation of the system test fixture, the system runs another self test as represented at decisional block 40-9; if the result is negative the system advises the test operator to notify the maintenance technicians who when they arrive, log on as represented at 40-10, ultimately make the repair as indicated at block 40-11 and log off, block 40-7, and return the station to the test operator who is allowed to restart the system. If the system tests good, the operator is prompted to remove the test fixture, as indicated at block 40-12 in the next figure, FIG. 2b. System log-on commences as indicated at block 40-13.

Tests performed include a measurement of electrical gains and/or losses in the network, switch and path losses, instrument characteristics, such as power, phase, pulse characteristics, voltage, current, resistance, and the like, and also initiates a digital self test, a test of the digital tester. The self test or calibration information is stored by the computer in a calibration database each time the test is run. This provides a check on all equipment or instruments. By reviewing calibration test results taken over a period of time one may notice a trend of one or more test instruments toward a below specification condition. This allows preventive maintenance to be performed.

The test operator scans the bar code on the unit under test, which is interpreted by the computer and the computer determines the kinds and types of test programs needed for the testing of that kind of unit: the test controller accesses the test cell controller and downloads any such programs as needed into the test controller's memory. The computer also determines the identity of the fixture needed by the test operator, as represented in block 40-14 to connect the particular unit under test to the test system and displays that information on the monitor. The calibration test fixture, earlier installed, is removed and the test fixture, adapter, identified on the monitor is installed as represented at block 40-15. As earlier described each test fixture is labeled with a bar code containing its identification. The operator uses the bar code reader to scan the fixtures label and input that information to the computer and the computer verifies that the fixture installed is the correct fixture as represented by the decisional block 40-16.

If the operator installed an incorrect fixture as determined at stage 40-16, the person removes same and installs the correct one as indicated at block 40-17 whereupon the verification procedure is repeated. Once the correct fixture is installed the system proceeds to make a circuit type decision as represented at block 40-18. If the test to be performed is digital and does not include an RF test, the process proceeds as at the circled letter c to the appropriate point in the process continued in FIG. 2c. However if an RF test will be performed on the unit under test as represented by the letter B, the system runs some further preparation as presented in FIG. 2c.

The system proceeds to normalize the preparation as represented in block 40-19 in which the computer prompts the operator to instal the appropriate cables and peripherals, such as couplers, splitters and the like. In the prior test, the equipment was tested through to the connectors 13, 17 and 21 illustrated in FIG. 1. In this step the test fixture and all associated cabling, represented by elements 14, 16, 20, 22, 24, 26 and 28 in FIG. 1, are now included in the closed electrical circuit being tested. At least one test connector, 18d in FIG. 1, is connected to an associated one of the adapter connectors 24, 26 or 28 to connect inputs and outputs together to complete a circuit loop that extends from the test instruments and associated cables, so as to provide a test of the complete loop, but without the unit under test. The information obtained in this test is temporarily stored by the test controller as a normalization database in anticipation of the test of the unit under test that is to follow. When the actual test of the UUT is run, the corresponding normalization test results are subtracted from the actual results to derive the corresponding or normalized test results. It is these latter test results that are subsequently stored by the test controller in a test result database and represents the true test results of the UUT's performance.

As represented in block 40-20 the system checks normalization; that is, the system checks stores and corrects for network anomalies such as ripple, sweep discontinuities, phase variation and the like. If the normalization checks good the system proceeds to block 40-23. Otherwise the system proceeds at block 40-21 to indicate the lines and cables that have improper normalization, such as occurs when a cable deteriorates and exhibits excessive power loss or is broken. With the defective line or cable connected the test operator may check and replace cables or clean switch contacts or replace connectors as represented at block 40-22 after which the normalization preparation of block 40-19 is repeated to ensure that the RF tester is fixed.

The operator connects the unit under test to the test fixture with all peripheral devices as instructed by the computer via the display monitor as represented in block 40-23. The tests are then performed as indicated at decisional block 40-24. The operator then initiates the tests prompted by the computer and, in some cases, this may require the operator to disconnect and then reconnect some peripheral units. The information obtained is transmitted to and is stored in the test cell controller associated with the station, including test data and pass or fail results of individual parameters of the unit under test. If the unit passes it is sent to the next stage of assembly and test. If the unit instead fails it is sent to another station where a technician "troubleshoots" the unit. As elsewhere described in connection with FIG. 1b the tests are made under the control of and in a sequence prescribed by the test program being executed by the test controller processor.

Although it is possible to perform troubleshooting at the same test station, in a factory assembly environment one does not usually wish to interrupt the assembly process. In order to allow assembly and test in higher volume the test operator at this station effectively limits testing to a "go" or "no-go" test and the operator can get on with testing other units so as not to interrupt the assembly of finished product. From the manufacturing standpoint the troubleshooting operator will collect and try to repair units and, if successful, will reintroduce the product at the beginning of the assembly line as indicated in the manufacture assembly process described later in this specification. Effectively the failed unit is taken off line and is diagnostically tested off line. Moreover because the assembly test operator's responsibility is thus limited, some of the equipment modules as may be used for diagnostic testing need not be included in the assembly test station.

Figure 2D:
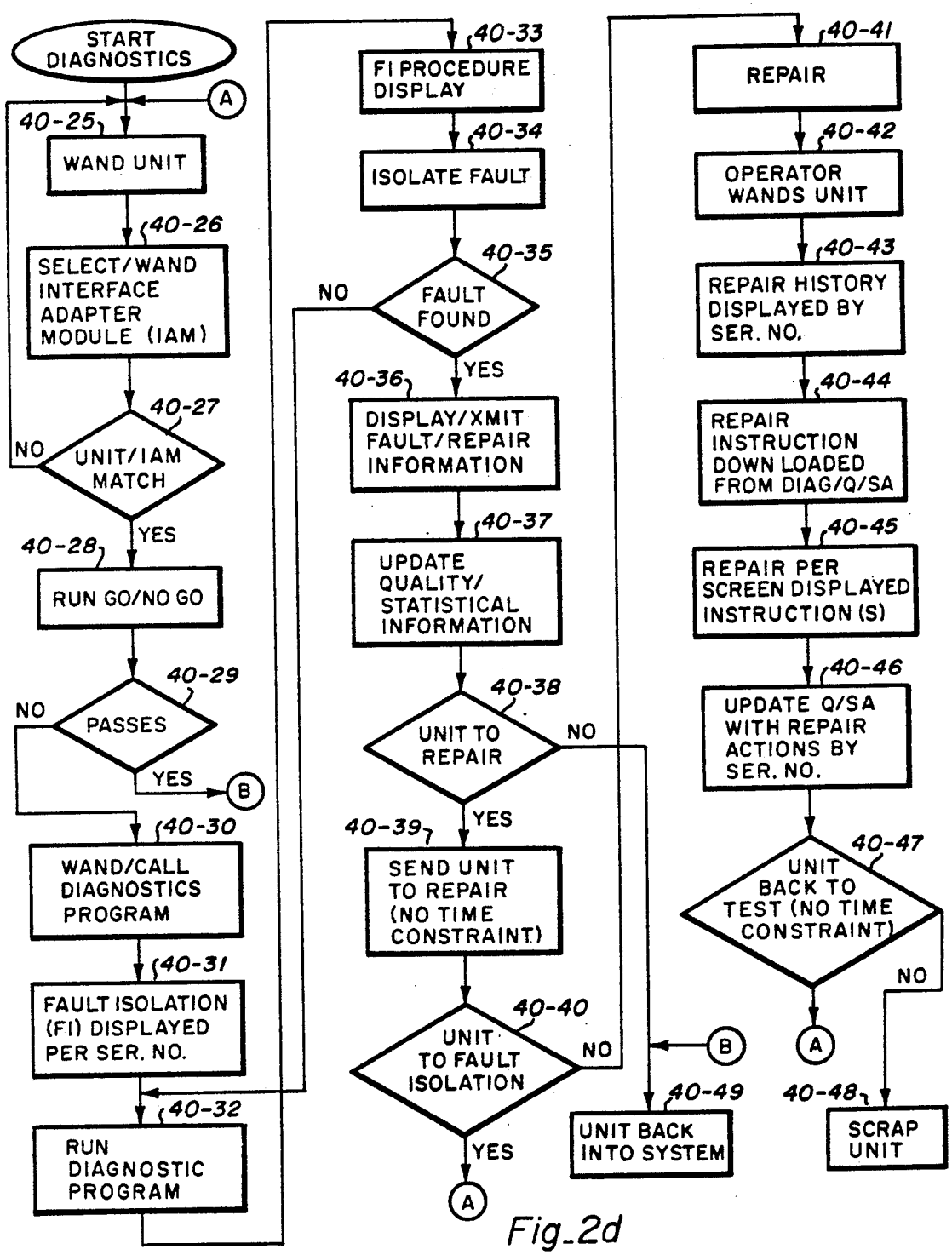
FIG. 2d is a flow chart illustrating the diagnostics testing procedure.

FIG. 2d presents the flow for diagnostic testing and fault isolation and repair. As indicated the operator "wands" the unit under test, that is scans the attached bar code label with the bar code reader as indicated by block 40-25, is advised of the correct test fixture, adaptor, installs same and has the computer verify installation as at block 40-26, and then proceeds through decisional block 40-27 to run the go/no-go test as indicated at block 40-28. If for some reason the unit passes at this stage it is sent back into the system as indicated at block 40-49, as would occur if the original test operator made a mistake. More likely however, the unit does not pass and the diagnostics program is selected from the menu displayed on the test station monitor as represented at block 40-30, fault isolation is displayed for the particular serial number of the unit under test and the diagnostic program is run as at 40-32. Depending upon the kind and type of fault only the digital or analog or RF diagnostic test need be used. The procedure is displayed as at 40-33. In connection with RF tests it is understood that a probe may need to be used to access certain stages not accessible through the edge connector on the unit and make appropriate measurements in response to specified RF stimulus, which is an exception to the general essentially hands-free testing herein described. If the fault is not found the diagnostic program is repeated and the next likely or most probable component or part failure considered.

It is conceivable and is not surprising to those skilled in the art that a fault will in some instances be impossible of location, in which case the unit would be scrapped. As those skilled in the art appreciate not every kind and type of failure can be anticipated in advance and it is not possible even for trained engineers to always determine with preciseness on the spot the particular part responsible for a failure It may take time and study. That is where acquired experience with the electronics devices being tested is important. In diagnostic work, this ability to diagnose and isolate faults is referred to as "coverage". The coverage is defined further as the product of fault diagnose, the ability to diagnose a fault expressed as a percentage of total ability, and fault isolation, the ability to locate the culprit component or element expressed as a percentage of total ability. As those skilled in the art appreciate it is rarely possible to achieve a 100% coverage of a failed unit. That coverage moreover, is reduced if access to an electronic circuit is limited as by conducting measurements solely through the edge connector of the unit under test. Nonetheless it is believed that a coverage of 95% is attainable with the described system, with a 95% capability on diagnose and a like capability on isolation.

The described system is capable of learning; that is as engineers and operators gain more experience on determining causes of failure, that information will be placed into the test controllers and associated engineering and test databases. As experience is acquired then the more probable it becomes that a particular fault will be isolated.

When the fault is isolated as at decisional block 40-35, which information may be entered via the keypad or the touch screen by the test operator, the computer displays the repair information as at block 40-36 and then updates the databases of information on the particular repair and the statistical databases as indicated at block 40-37. As indicated at decisional block 40-38, if the fault is relatively minor the diagnostic operator may undertake and make the repair or adjustment and send it back into the system as indicated by block 40-49 and/or decide to send the unit off line to a more fully equipped repair station as indicated by decisional block 40-39.

The repair procedure is started as indicated at block 40-41, with bar code scanning of the unit's label as at block 40-42, the display of the repair history on the particular unit under test as at block 40-43, and automatically receives the repair instructions as indicated at block 40-44, which the test controller retrieves and displays. The repair operator makes the repair as indicated by block 40-45; updates the repair history for the particular unit by entering the action taken into the computer via keypad or keyboard as represented by block 40-46 and then sends the unit back to the diagnostic test operator as at 40-47 to re-run the tests, indicated by the letter A, or alternatively, if it is determined that it is not possible to repair the unit, sends it to scrap as indicated at block 40-48. When sent to the diagnostic test operator, it is seen in the flow chart that the unit eventually passes at block 40-29 and goes back into the assembly system as indicated at block 40-49.

The digital and RF tests are taken as representative for purposes of this explanation. Turning again to FIG. 1, the operator depressed the appropriate key to activate the previously downloaded digital test. The test controller responds by applying appropriate instruction via cable 35 prompting the digital tester 5 to output appropriate loaded stimulus vectors, which are applied by the I/O circuit 11, adapter 13 and 14 to fixture portion 22 and thence to the connector 24, which is plugged into the UUT. The UUT responds with a "signature" that is compared to an expected response with status being transmitted to the test controller via the same route. The test controller applies a sequence of such test stimulus. In the preferred operation a comparison is made in real time with the expected data. It is noted that in de-bug kinds of operation the response may be stored, at least temporarily. In the manner earlier explained the computer "looks up" the particular fault, if applicable, and issues its decision, displaying its conclusion to the user and logging it into the record for that particular apparatus. Assuming that the apparatus so tested is issued a clean bill of digital health, the operator may proceed to the RF test where the same process is repeated using RF stimulus and making RF measurements.

If the signature reveals a defect a display of the possible faulty parts is presented. These parts may be marked by the technician and replaced. Suitably after replacement the unit is tested anew to ensure a proper repair. Information regarding the defective part is stored in the test cell controller for further analysis. This analysis will include, but is not limited to, information such as similar failed parts, frequency of failure, other circuits where the same part has failed and manufacture.

All of the tests, with rare exception, are performed through an edge connector in the equipment under test. More often than not the electronic circuits are densely packed as more and more features are added by the manufacturer while the space for the avionics package is limited. Accordingly it has become difficult if not impossible to access the internal circuits with a test probe in order to individually test a given semiconductor "chip". While the foregoing has been described in connection with avionics packages, like circumstances apply as well in many other fields. It is thus preferable for faults to be diagnosed without access to and probing around the internal contents of the assemblies. This is accomplished instead by accessing only the edge connector of the unit, taking measurements of the electrical leads presented at this connector or supplying test vectors to certain of the leads while measuring and or analyzing the signatures outputted by the assemblies circuits in response. Those skilled in the art appreciate that this procedure involves a tradeoff consistent with the purposes of the present invention: More ready diagnose may often be made by use of probes and a highly skilled test technician than by the test vector technique. However with lesser skilled technicians the present system including the described databases are believed to offer a ready means to pick out the defective part in a inoperative assembly under test.

With that mention of the general rule, the exception is given: The diagnostic station includes a probe, represented as element 18e in FIG. 1, for assisting in RF fault isolation. While most circuits are so densely packed as to preclude use of a probe, that is not necessarily as yet the case with RF sections of equipment. The probe is connected to a RF measurement instrument at the appropriate time. If access is available, then the diagnostic program provides appropriate prompts to the operator to locate the probe at a certain location in the RF circuit, then initiate the stimulus signal and measure the output at the probe location. The ability to track down a specific defective part is enhanced, though more complicated for the operator than that automatically measured through the edge connector of the unit under test.

As described and illustrated the test operator has available a very "user friendly" environment. The test operator has available many of the high tech computer peripheral devices now commonly used with personal computers, such as a computer graphics monitor, keyboard, keypad, mouse and, the familiar instrument seen in some grocery stores, the bar code reader. Of these the operator needs to manipulate only the keypad and bar code reader, the former to log onto the system and to call up the diagnostic and other software associated with the unit under test and the keypad to enter the selection according to the prompt or menu displayed on the monitor. Alternatively instead of the keypad input, the computer monitor may have the known "touch screen" in which event menu options may be entered by touching the appropriate position on the CRT screen. The remaining elements are reserved for use as needed by more highly skilled engineering personnel. The software is entirely transparent to the operator and its contact to the system is through the simplified interface. The operator need not be bothered by the complexities of the technologically complex test equipment, which is essentially transparent to the person. The operator need only log on, initialize a test program, insure the unit being tested is properly connected to the fixture and give the go ahead to the test. It may be said that the difficult work is done by the computer at a faster rate and more accurately with higher repeatability than could be accomplished by a human.

As those skilled in the art appreciate the test station effectively is of open architecture. Open architecture provides flexibility and expandability. The unit may be used to test and evaluate different avionic products at the same station. Only the software applications programs and "fixturing" specific to the new avionic product need be changed. Moreover as new generations of avionics equipment is created the same test set up may be used with slight adaptation. The past practice requiring discard of the entire test set is avoided and is expected to provide substantial savings.

The quality and process data on units to be tested in the test station is maintained at the test cell controller in a relational type of database and is available upon request to any process station along the factory network. That data may be delivered to another location in the network selectively in raw format or in report form format.

Built in test, BIT, and design verification simulations originating with the designer is used, resulting in consistency and fast design in testing. Because of the complexity of electronic apparatus, there is more often than not included in the apparatus internal test circuitry or connections to components within an assembly that are coupled to contacts on the connector. This is referred to as built in test, BIT, and the inserted circuits and leads are often referred to as "hooks". Thus in addition to normal circuit leads at the connectors, the additional contacts for the hooks allow one to access internal circuits with external measuring equipment to aid in fault diagnose and isolation.

Artificial Intelligence based programs are incorporated into the system to advantage in permitting fault diagnose. Programs of this type have become available and can be taught or trained to make decisions, demonstrating thereby some intelligence akin to human intelligence. By example, a program "Neural Network" offered by the California Scientific Systems, Sierra Madre, Calif. simulates human neurons to an extent and can be trained to simulate human judgment based on given inputs. Others are referred to in the patent literature mentioned in the background to this specification, namely U.S. Pat. No. 4,796,206 to Boscove.

Thus as an adjunct to a look up analysis of a signature in the fault dictionary if there is any ambivalence as to which part caused a fault, the program may resort to the repair record data base and with that as additional input information, the artificial intelligence program can prioritize the possible faulty parts, which the test controller may output as part of its diagnose.

Figure 3:
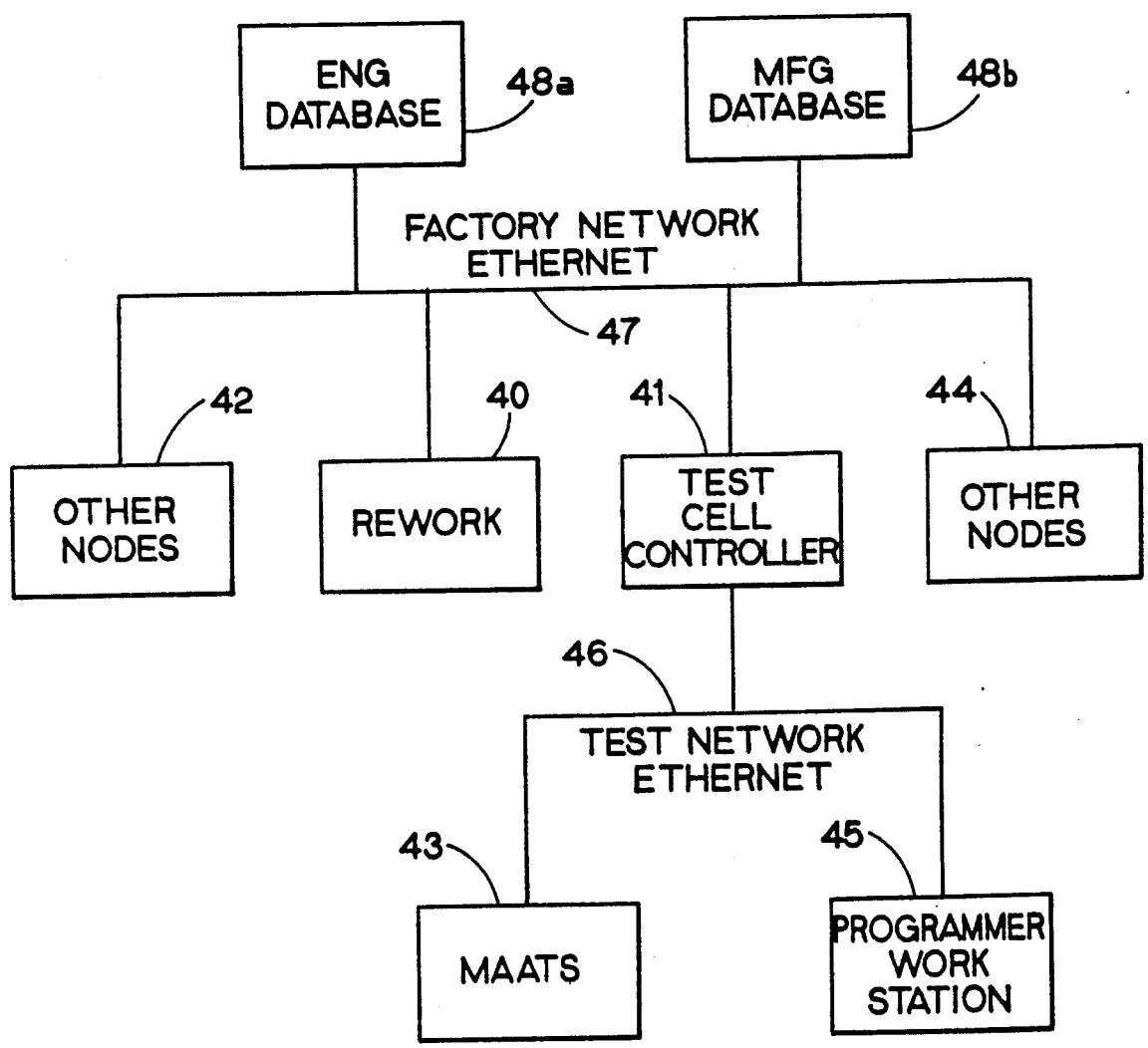
FIG. 3 is a functional block diagram showing the relationship of the test station as part of a novel system.

FIG. 3 illustrates the organization of the test station as part of an overall network. Thus the test station of figure I is illustrated as formed of the test cell controller 41 and the remaining elements in block 43, labeled MAATS. For completeness a programmers station is represented in block 45, which may consist of a controller, a monitor and a keyboard that are coupled to the test controller 3 contained in the station via a cable and connector 38 as illustrated in FIG. 1, in a "test" network 46 to allow a programmer to generate, fix or correct programs at the station, without interfering with the test operator. The programmers workstation 45 is preferably included in the system and is connected to the test network as a remote node. The programmers station is used to remotely program the MAATS and allow remote execution of all software resident in the MAATS and in the Test Cell Controller.

The test cell controller is coupled to a "factory" network 47, which may be of the familiar "Ethernet" arrangement advanced by the Xerox Company, and through that network is coupled to an engineering database 48a and a manufacturing database 48b. Other test stations of like structure, such as would be presented in a factory assembly line, are represented by blocks 42 and 44, labeled "other nodes" the purpose of which is discussed later in this specification and a block 40, labeled "rework".

The test cell controller communicates with the engineering database to withdraw data from the configuration control database, post process database and the program generation database; obtaining therefrom simulation output data, input vectors, a net list, a parts list, and a topology data. The test cell controller sends to the engineering database test data related to performance of the units under test and any data indicative of deficiencies in the simulation output and vectors earlier supplied so that engineering personnel responsible for the engineering database may attempt to resolve the insufficiencies. Some of the information sent by the factory database to the test cell controller may include an incoming schedule and inquiries for data and system status. Typical of information sent by the test cell controller to the factory database is data on repair made to units under test, test results to the scheduler, quality data, and MRP II data.

The test cell controller sends the test programs to the test controller. The test controller sends test results, failure information and the identity of the unit under test to the test cell controller. The test controller sends the test to be performed to the digital tester and the digital tester in turn sends the test results back to the test controller. Likewise the test controller sends the analog test and RF test to the analog and RF testers respectively and receives back the test results.

In accordance with the invention any test station may be operated by the programmer to contact any other test station in the factory network. That is not allowed to the test operator who does not have and who cannot enter the required authorization codes.

Further the test station may through the test cell controller contact the main computer containing the engineering database 48a and manufacturing database 48b and receive and/or transmit information, including programs and data. That transmission may be initiated in one of many known ways or all possible ways in accordance with the invention. Update information may be sent automatically from the factory computers to each of the test stations, upon the initiation of the factory main computer. Alternatively the test cell controller may periodically automatically inquire as to the existence of an update and trigger transmission or "downloading" of same. Also the test operator could prompt the test computer to check for an update. All forms are possible within the scope of the present invention.

Ideally the two remote databases contain the master copy of the design and test programs, such as a fault dictionary, and the manufacturing database contains the records and statistics on the products being assembled, allowing for management reports and also allowing for operator or computer use in making educated guesses in diagnosing faults and finding a culprit defective part among a large group of possibilities.

The management reports contains, for example, information such as failure rates of individual circuits (components, boards or modules), vendors with a history of high failure rates, cause of failures, etc. The report format is very flexible allowing the report to be printed in any manner which the operator requests.

The computer uses the same data base for fault diagnostics and isolation. The expert/artificial intelligence network takes all prior information and uses this data to identify the most logically failed part. This information is updated ideally in real time to insure that the data base is always up to date, although it is more practical to update the file within a day or two.

The manufacture of an electronics avionics system is accomplished in a logical progression as represented in the flow diagram of FIG. 4 to which reference is made. In this figure the stages of the manufacturing process is briefly described in the form of blocks. Most of the steps in this process are of a conventional nature known to those skilled in the art and consequently only brief explanation is given as to those; greater explanation is given to the testing and its place within that process.

Parts, including printed wiring boards, are received and inspected as at 50a; defective parts located being returned to the supplier and those accepted are passed to the printed wiring board preparation workcell indicated at 50b. In this workcell the boards are brightened and baked to enhance their characteristics. The boards then proceed to the solder application workcell as at 50c and then are forwarded to the next workcell 50d where components are prepared and mounted, stuffed into the circuit boards, suitably by automatic insertion machinery, common in the industry, and the units are inspected. At workcell 50e the board is then baked and subjected to a solder reflow process. In that process the solder applied to the board prior to the insertion of the components is reheated and reflowed, flowing to the leads of the inserted components and soldering them in place. The board assembly is then inspected as at block 50f, labeled "verify", to ensure that the solder joints formed in the prior step appear to have proper integrity, failing which the board is "re-worked" as is common practice. Following successful soldering, various post soldering work is accomplished as represented in block 50g.

Post solder activity includes additional assembly of components that require special handling. These components include parts with high thermal dissipation which require special compounds (i.e. thermal adhesives) for heat transfer. Thereupon the board assembly, which is referred to as a PWBA in the nomenclature herein used is received within the test workcell as at 50h, which may be described in further detail.

Figure 4A:
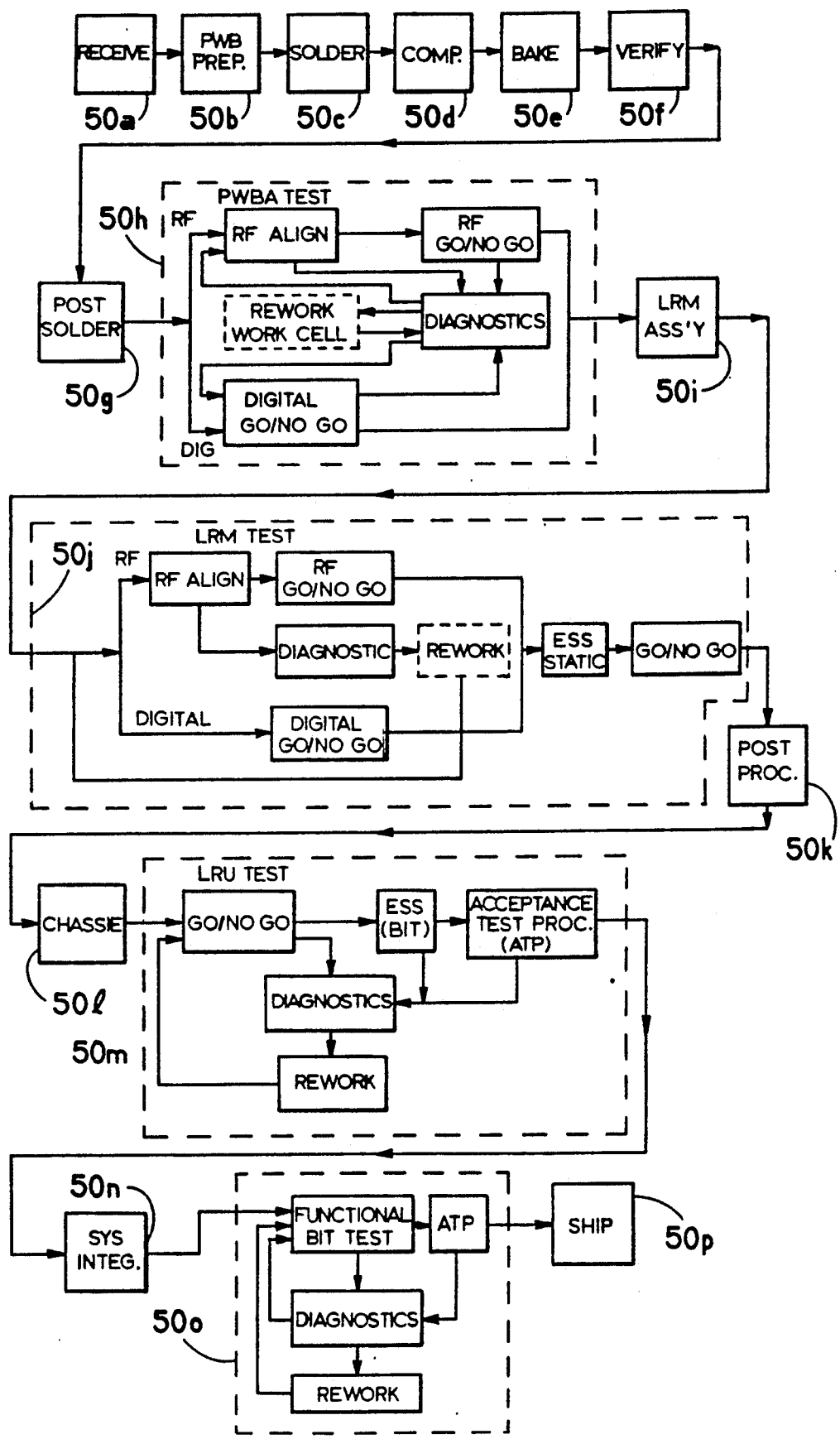
FIG. 4a is a flow chart depicting the manufacturing and assembly process according to the invention.

In the manufacturing and test procedure illustrated in FIG. 4a, a printed wiring board assembly, PWBA, is prescreened by a process analyzer which checks the board for continuity, shorted traces and open circuits. This may be by either a contactless (infrared) or contact means (bed of nails).

The PWBA is then connected to the test station adapter and a "power up" test is performed. BIT and functional tests are performed via the edge card. If the unit passes these tests, it is sent to the line replaceable module assembly area 50i. On the other hand, if it fails it is sent to the PWBA diagnostic test station as indicated as "diagnostics" in the figure. At the diagnostic test station the faulty component or components are isolated. The station interface is connected to the PWBA edge connector and the test program is run to provide the stimuli, measure the response, analyze the response and provide and store a report as to the defective components in the manner elsewhere herein described in greater detail. The PWBA is then sent to the repair station, identified as "re-work" in the cell in the figure, where the defective components are replaced with the assistance of the repair instructions.

As earlier described in connection with the operation of the test station of the preferred embodiment the PWBA is tested. By employing the bar code reader the technician scans the attached label and the test cell controller responds with the rework instructions for same displayed on monitor 23. In turn the technician enters the repair information into the test station keyboard which is received and stored in the test cell controller. In this way a complete on-line non duplicated database of all PWBA activity relating to test is maintained for other use and record keeping.

Upon completion of the repair the unit is subjected to the diagnostic test and if successful the unit is returned to the BIT test station, where that test is again performed. Upon successful rework, the board is delivered to the line replaceable module assembly area indicated at 50i in the figure, labeled "LRM assembly".

Two or more integrated printed wiring board assemblies are regarded as a Line replaceable module, abbreviated as LRM. At workcell 50i compound is applied and cured to accomplish two purposes. The first is to adhere the boards to the module assembly and the second is to provide a good thermal conductive path from the components to the housing.

The assembly is then delivered to the next workcell which is a test cell 50j. The LRM is initially tested with either or both a digital go/no go test and/or an RF alignment and RF go/no go test, a pass or fail situation, depending on the circuits in the equipment, and if it passes the unit is passed to the next workcell 50k. If the LRM fails it is sent to diagnostic station indicated within test cell 50j. Through the diagnostic test, the defective one (or more) of the printed wiring board assemblies is identified, a new diagnostic routine is loaded by the operator into the test controller simply running the bar code reader across the tag attached to the PWBA as earlier described, and the faulty component or other defect is isolated. The LRM is then passed to a repair station indicated as "rework" in the figure and the defective parts are replaced whereupon the LRM is returned to the diagnostic station and is retested. If the repair tests correct, the LRM is returned to the "functional test step and is retested. Assuming the test is successful the LRM is passed to the next stage of assembly for post test processing indicated as at 50k.

In workcell 50k the assembly is cleaned, inspected, masked conformal coating is applied and unmasked. At the next stage 50l, labeled "Chassis", the chassis assembly is completed. Panel subassemblies, cables and enclosures are brought together in this workcell and assembled with the LRM to form a "unit" or LRU. The integration of two or more of the line replaceable modules, LRM's, earlier described defines a line replaceable unit, or LRU.

At stage 50m the LRU is tested, initially for function and then is given a built in functional test, represented in the block ESS, environmental stress screening, and then is given the acceptance test procedure. If it passes those tests it is sent to the next assembly stage 50n. If however the LRU fails any of the tests at this stage it is sent to the diagnostics station associated with the test cell and once diagnosed and repaired is sent back to the beginning of testing at block 50m to ensure that the unit is double checked.

Once the defective LRM is identified, it is tagged and the entire LRM is sent to the LRM process level station earlier described for fault location and repair according to the steps earlier described for same. Alternatively the defective LRM may be removed from the LRU and replaced with a known functional LRM with the defective LRM sent back to the beginning of the LRM line. However in most instances the disassembly is a less desirable alternative and involves substantial work. Remembering that the LRM had passed testing to reach the present stage, failure may be due simply to an accessible part that perhaps was damaged in being mishandled between assembly stations.

At the LRU environmental stress screening stage, ESS, the assembly station runs an LRU BIT test routine. The workstation operates the BIT routine, supplies required stimulus, reads responses, evaluates the responses and logs in all test related information to the "test management database" contained within the test level cell controller. If the LRU passes the entire screening process then it is considered acceptable and is passed to the next station at 50o where an acceptance test is performed. If it fails it is returned to the prior station and is diagnosed and repaired as earlier described, thus providing a logical flow to the equipment and ensuring that it is satisfactory.

The final test for all line replaceable units is the Acceptance Test Procedure, ATP. In this test the workstation supplies RF, analogue and digital stimulus to the unit, measures the result and provides a printed report upon request. At this stage the capability of the LRU is determined to meet or not specifications established in the test specification document. If the unit fails, the LRU is returned to the LRU diagnostic station for diagnose and repair and reinsertion into the assembly and test cycle from that point. If successful the unit is inventoried for crating and/or packing and shipment to the customer as indicated in the last block 50p, labeled "ship".

Figure 4B:
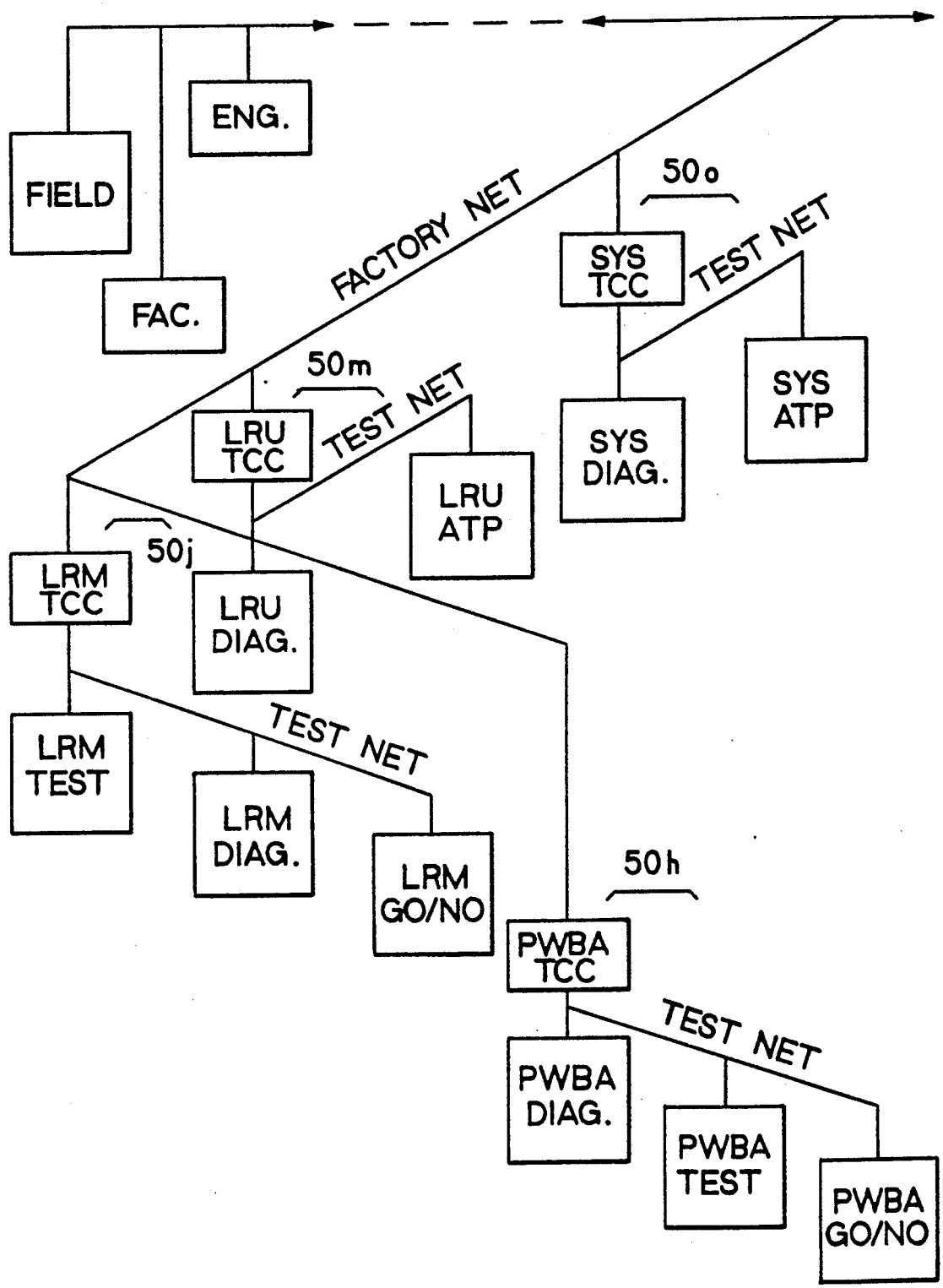
Figure 4C:
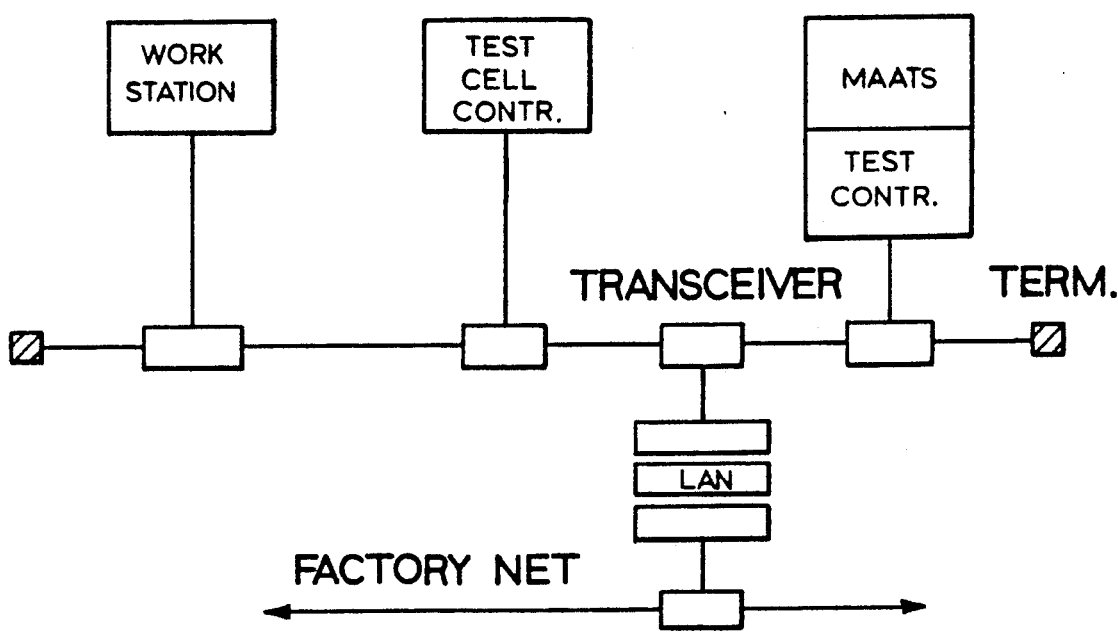
FIG. 4c shows the physical connection used in networking.

In the foregoing manufacturing flow chart reference was made to the various test stations within the factory. These test stations are networked as illustrated in the diagram of FIG. 4b. As earlier noted not every test station requires a test cell controller in addition to the test controller. Thus the system test stations are coupled together by a common test network to a common test cell controller, SYS TCC. The same arrangement exists for the LRU cell test stations which are tied to the LRU TCC; similarly for the LRM test cells which are tied to the LRM TCC and last the PWBA cell testers are tied to the PWBA TCC. In turn all of the test cell controllers are networked or "linked" over a factory network as shown.

This factory network connects to other nodes as earlier represented in FIG. 3 and can extend remotely to a customers facility as represented by the block marked "Field" which depicts a complete test station containing an individual test cell controller. Conceivably all of the test stations in a single production facility may be modified to use a single large capacity test cell controller in common. However, because the controllers are intended to handle a large quantity of programs so doing could require time sharing and slowdown of production. Several test cell controllers are preferred. Further the PWBA test station generally contains or downloads such software from the associated test cell controller as is necessary to perform the tests at that station. Similarly the LRM test station downloads preferably only the programs needed for the tests carried out at that station. Likewise the same arrangement is made for the LRU test station and the SYS test station. There are a large number of programs in the system. By minimizing the quantity of programs downloaded to any given station, the need for greater memories are avoided, providing some economy, and the test controllers speed is maintained high by not having to account for unused programs.

The factory network and the test network was represented in FIG. 4b in a "logical" form as two separate networks. Physically, however, the two networks in part share a common transmission line as represented in block diagram form in FIG. 4c. This logical separation and physical consolidation is possible by the inclusion of a "LAN Bridge", labeled LAN in the figure, in the communication path between the factory network and the transmission line. The programmers work station, the test cell controller, and the test station containing the MAATS units with the test controller are shown coupled via suitable transceivers by a transmission line with the line having terminating loads at each end. This transmission line also serves a the test network. As is known, the LAN Bridge allows only predefined digital signals to pass and others not. Further the signals from the factory network intended for the test cell controller and vice-versa are of a form that is not recognized by the test controller at the MAATS test station. Although a single transmission line is preferred to minimize the cost of the system, as those skilled in the art recognize it is possible to substitute two physically separate transmission lines, one for each network, in which event the logical depiction of FIG. 4b would be the same as the physical depiction.

Figure 5:
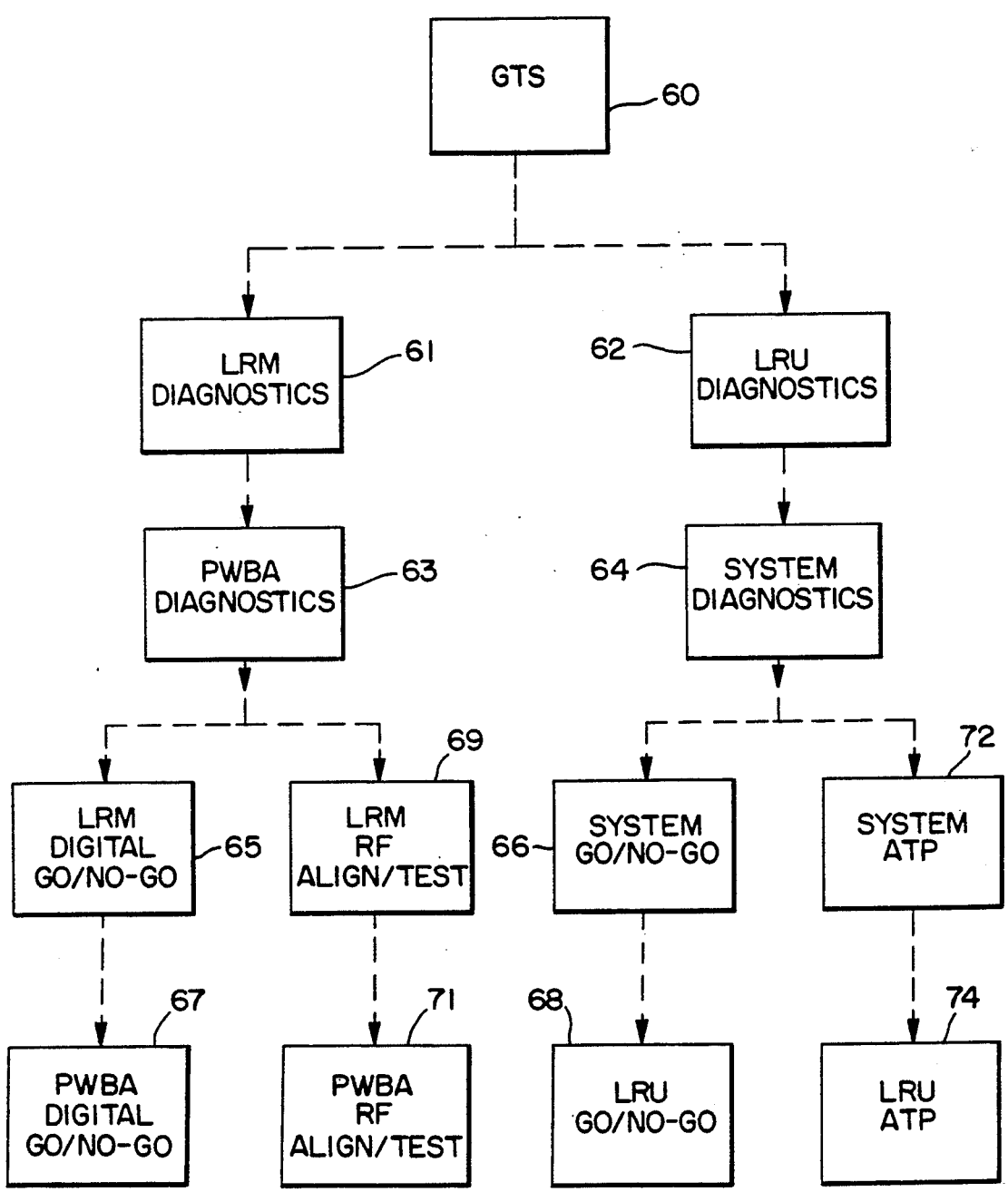
FIG. 5 is a diagram indicating the hierarchy between the various kinds of test stations used in the manufacturing system of FIG. 4.

FIG. 5 illustrates the capability hierarchy of the particular test workstations depicted in the production test system described in connection with FIG. 4 with each block in the system representing a particular station. The embodiment of FIG. 1 which was earlier described as fully equipped is capable of performing all tests. Consequently that test station contains the most test equipment and is the most expensive to construct. In as much as only some tests are performed at the stages of production, less test equipment is required. At the earlier stages along the production line the test station consequently will be of the same overall physical configuration, from which one or more modules are omitted.

At the top of the hierarchy thus is the fully automated station 60. To the left side of the figure, the next capable station is the LRM diagnostics station 61; beneath that the PWBA diagnostics station 63. Branching from this station to two branches of equal hierarchy is the LRM digital go/nogo station 65 and the PWBA digital go/no go 67 on the left and the LRM RF align/test station 69 and the PWBA RF align/test 71. Returning to the second branch on the right under the station 60 the highest hierarchy is the LRU diagnostics 62; beneath that the Systems Diagnostics 64. From that point two equal branches stem: To the left side is the System go/nogo 66 and to a lower level the LRU go nogo 68; and to the right side the SYSTEM ATP 72 and under the latter the LRU ATP 74. Should a particular test workstation fail for any reason, the production line may be maintained simply by doubling up on the duties of a test station that is higher in the hierarchy, since the higher hierarchy station has the capability of performing all tests of lower hierarchy stations.

Notwithstanding the omission of selected test equipment in the fore described test stations all of the stations have the same controller, operating systems, test language, instrumentation drivers, spares, operator instructions, training, maintenance, and interface to cell controller.

The present invention achieves a test station and system that is versatile and easy to operate of benefit to the factory and to customers who maintain repair facilities. By allowing necessary testing of complex electronic apparatus to be more easily accomplished, circuits of greater complexity may be included in future equipment since its maintenance and repair is thus manageable. The test station may be sold to an equipment customer for use at the customer's own facility. The appropriate technical information for tests may be sold and delivered to the customer in the form of software made available on magnetic disk or other media or via network communication to the factory. All of the tests may easily be updated and through experience improved, "fine-tuned"; the customer can purchase and install the updates. In great part the need to generate, distribute, library, read and understand paper documentation on thousands of tests may be essentially eliminated. More importantly when new systems are developed the customer need only acquire the associated test software and test fixtures to have an acceptable test set using most if not all of the test instrumentation and the like originally purchased.

Factory to customer transportability, also known as vertical commonality, provides a direct link between the production facility and the user. Both hardware, the test stations, and software, the operational software and application test programs, used to produce and diagnose faults on deliverable equipment in the production facility can be transferred to and used by the customer, whether that facility be an organizational or depot level facility. This is a direct transfer. Since the test equipment and the associated software are identical in structure, modification or translation is not required. At the various levels of maintenance, test can start immediately. Information regarding quality and statistical analysis of parts failure may then be shared and transfered between all customers to supplement and expand the data base.

As is evident the present invention is not concerned with or dependent upon the details of any particular program referred to herein, though new programs and processes are disclosed. The invention also makes use of available kinds of programs and additional programs that may be developed along the lines taught in this specification.

It is believed that the foregoing description of the preferred embodiments of the invention is sufficient in detail to enable one skilled in the art to take and use the invention. However, it is expressly understood that the details of the elements which are presented for the foregoing enabling purpose are not intended to limit the scope of the invention, in as such as equivalents to those elements and other modifications thereof, all of which come within the scope of the invention, become apparent to those skilled in the art upon reading this specification. Thus the invention is to be broadly construed within the full spirit and scope of the appended claims.

What is claimed is:

1. A method of automatic testing of electronic apparatus by means of programmable electronic test instrumentation means in a test work station of the kind containing programmed computer means for issuing commands to said electronic test instrumentation means and receiving results of tests performed by said test instrumentation means, said test instrumentation means being operatively coupled to and controlled by said programmed computer means, with said programmed computer means including memory means for storing information, and in which said test instrumentation means is coupled to said electronic apparatus under test via a path, said path including configurable input-output switch means controlled by said programmed computer means and adaptor means, having an input and output, for interconnecting circuits extending through said configurable input-output switch means to a connector means on said electronic apparatus under test, said adaptor means having electrical characteristics relevant to the measurement of said electronic apparatus under test, which includes the steps of:

establishing a closed path between said test instrumentation means and said adaptor means output with said electronic apparatus being disconnected from said adaptor means;

initiating operation of said test instrumentation means to perform predetermined tests, wherein the electrical characteristics of said test instrumentation means, said configurable input-output switch means and said adaptor means may be isolated and determined apart from electrical characteristics of the electronic apparatus under test, and for providing test results obtained thereby to said programmed computer means to provide normalization information;

storing said normalization information in said programmed computer means at least temporarily; connecting said electronic apparatus under test to said adaptor means;

initiating operation of said test instrumentation means to perform predetermined tests, wherein the electrical characteristics of said test instrumentation means, said configurable input-output switch means, said adaptor means and said electronic apparatus under test are collectively determined and for providing such collective test results obtained thereby to said programmed computer means with said computer means temporarily storing such collective test results;

subtracting the corresponding normalization test results from said collective test results to provide test results for said electronic apparatus under test, whereby the performance characteristics of said electronic apparatus under test are isolated from the corresponding effects of said test instrumentation means, said configurable input-output switch means and said adaptor means; and storing the test results of said electronic apparatus under test thereby derived.

2. The method as defined in claim 1 further including the steps of:

establishing a closed path between said test instrumentation means and said configurable input-output switch means with said adaptor means being disconnected from said configurable input-output switch means;

initiating operation of said test instrumentation means to perform predetermined tests, whereby the electrical characteristics of said test instrumentation means and said configurable input-output switch means may be isolated and determined apart from electrical characteristics of said adaptor means and the electronic apparatus under test, and for providing test results obtained thereby to said programmed computer means to provide calibration information; and storing said calibration information in said programmed computer means.

3. The method as defined in claim 2 wherein said step of establishing a closed path between said test instrumentation means and said configurable input-output switch means includes the step of:

plugging an electrical test connector means into place in said configurable input-output switch means in lieu of said adaptor means, said test connector means containing electrical interconnections therein for selectively interconnecting electrical paths through said configurable input-output switch means.

4. The method as defined in claim 1 wherein said step of establishing a closed path between said test instrumentation means and said adaptor means output with said electronic apparatus being disconnected from said adaptor means includes the step of: plugging an electrical test connector into place in said adaptor means in lieu of said electronic apparatus under test, said test connector means containing interconnections therein for selectively interconnecting paths through said adaptor means to form closed paths.

5. The method as defined in claim 1 wherein said test instrumentation means comprises:

a plurality of RF stimulus signal sources; and
a plurality of RF response measurement devices;
and wherein said configurable input-output switch means includes a plurality of inputs and a lesser plurality of outputs with said RF stimulus signal sources and said RF response measurement devices being connected to corresponding ones of said switch means inputs and with said switch means outputs being connected to said adaptor means, whereby a stimulus signal may be routed through said adaptor means to equipment under test or to a test connector back to said RF response measurement devices;

said configurable input-output switch means being selectively controlled by said computer means to establish a selective connection through said switch means for at least one of said RF stimulus generators and at least one of said RF response measuring devices for providing an electrical path between said adaptor means and selected ones of said RF stimulus generating means and a second electrical path between said adaptor means and one of said RF response measurement means, whereby initiating operation of each of said RF stimulus generating means and said RF response measuring means with said test connector in place in said adaptor means, a stimulus signal is routed through said configurable input-output switch means and said adaptor means and said test connector means to said RF response measurement means; and wherein said step of initiating said tests includes the step of:

sequencing different combination of said RF stimulus source means and said RF response measurement devices in said electrical path to produce test results of a plurality of different electrical characteristics.

6. A test workstation for testing electronic apparatus under test including electronic subassemblies, assemblies and units, which test workstation includes:

programmable electronic test instrumentation means;
test controller processor means for issuing commands to said electronic test instrumentation and receiving results of tests performed by said test instrumentation;

said test instrumentation being operatively coupled to and controlled by said test controller processor means, with said test controller processor means including memory means for storing program and data information;

display means controlled by said test controller processor means for displaying information to a test operator;

operator input means for permitting a test operator to enter information into said test controller processor means;

configurable input-output switch means controlled by said test controller processor means coupled to said test instrumentation means;

electrical adaptor means, having an input end for connecting circuits extending through said configurable input-output switch means and an output end for coupling therethrough circuits from said input end; said adaptor means being detachably connected to said configurable input-output switch means;

said test instrumentation means being adapted to be coupled to an electronic apparatus under test via an electrical path, said electrical path including said configurable input-output switch means and said adaptor means and said adaptor means and said test instrumentation means having electrical characteristics interposed in said path relevant to the measurement of said electronic apparatus under test;

said electronic apparatus under test containing a connector means adapted to mate with said output end of said adaptor means;

first test load means for establishing a closed electrical path between said test instrumentation means and said adaptor means output with said electronic apparatus under test being disconnected from said adaptor means;

means for initiating operation of said test instrumentation means to perform predetermined normalization tests with said test load means being coupled to said adaptor means in lieu of an electronic apparatus under test to produce normalization test results, wherein the electrical characteristics of said test instrumentation means, said configurable input-output switch means and said adaptor means is isolated and determined apart from electrical characteristics of the electronic apparatus under test;

means for sending said normalization test results obtained thereby to said test controller processor means to provide normalization information;

said test controller processor means being responsive to receipt of said normalization information for storing said normalization information at least temporarily in a normalization database;

means responsive to said unit under test being coupled to said adaptor means and said adaptor means being coupled to said configurable input-output switch means for initiating operation of said test instrumentation means to perform predetermined tests, wherein the electrical characteristics of said test instrumentation means, said configurable input-output switch means, said adaptor means and said electronic apparatus under test are collectively determined;

means for providing such collective test results obtained thereby to said test controller means with said test controller means temporarily storing such collective test results;

means for subtracting the corresponding normalization test results form said collective test results to provide test results for said electronic apparatus under test, wherein the performance characteristics of said electronic apparatus under test are isolated from the corresponding effects of said test instrumentation means, said configurable input-output switch means and said adaptor means;

means for storing the test results of said electronic apparatus under test thereby derived in an electronic apparatus test history database; and means for sending said test results to said display means for display to an operator.

7. The invention as defined in claim 6, further including:

second test load means for connection to the output end of said configurable input-output switch means in lieu of said first test load means or said electronic apparatus under test for establishing means and said configurable input-output switch means;

means for initiating operation of said test instrumentation means to perform predetermined tests, whereby the electrical characteristics of said test instrumentation means and said configurable input-output switch means may be isolated and determined apart from electrical characteristics of said adaptor means and from the electronic apparatus under test, and for providing test results obtained thereby to said test controller processor means to provide calibration information; and means for storing said calibration information in said test controller processor means in a calibration database.

8. The invention as defined in claim 6 wherein said test instrumentation means comprises:

a plurality of RF stimulus signal sources; and a plurality of RF response measurement devices;

and wherein said configurable input-output switch means includes a plurality of inputs and a lesser plurality of outputs with said RF stimulus signal sources and said RF response measurement devices being connected to corresponding ones of said switch means inputs and with said switch means outputs being connected to said adaptor means, whereby a stimulus signal may be routed through said adaptor means to equipment under test or a test connector back to said RF response measurement devices;

said configurable input-output switch means being selectively controlled by said test controller processor means to establish a selective connection through said switch means for at least one of said RF stimulus generators and at least one of said RF response measuring devices to establish an electrical path between said adaptor means and selected ones of said RF stimulus generating means and one of said RF response measurement means, whereby initiating operation of each of said RF stimulus generating means and said RF response measuring means with either of said first or second means in place, a stimulus signal is routed through said configurable input-output switch means and said adaptor means and said respective test load means to said RF response measurement means; and:

means controlled by said test controller processor means for sequencing different combinations of said RF stimulus source means and said RF response measurement devices in said electrical path to produce test results of different electrical characteristics.

9. The invention as defined in claim 6 wherein said test instrumentation means includes a plurality of different programmable RF stimulus generating means and RF response measuring means and wherein said test controller processor means includes program means for sequentially configuring said configurable input-output switch means to provide a sequence of electrical paths therethrough of different ones of said plurality of RF stimulus generating means and corresponding ones of said plurality of RF response measuring means and for correspondingly commanding operation of different combinations of said programmable RF stimulus generating means and RF response measuring means.

10. The invention as defined in claim 6 wherein said test instrumentation means further comprises:

digital tester means for testing digital circuits;

analog tester means for testing analog circuits; and

RF tester means for testing RF circuits; each of said digital, analog and RF tester means being individually detachable from said system without affecting operation of any remaining attached tester means.

11. The invention as defined in claim 6 wherein said test instrumentation means comprises further:

RF test instrumentation module means for performing a plurality of RF tests; said RF test instrumentation module including:

a plurality of RF stimulus signal sources; and a plurality of RF response measurement devices;

and wherein said configurable input-output switch means includes first configurable input-output switch means associated with said RF test instrumentation module means; said first configurable input-output switch means including a plurality of inputs and a lesser plurality of outputs with said RF stimulus signal sources and said RF response measurement devices being connected to corresponding ones of said configurable input-output switch means inputs, said switch means including control means responsive to digital information supplied to an input by said test controller processor means for selectively establishing at least two connections between said plurality of inputs and outputs prescribed by said test controller processor means, whereby a selected stimulus signal is applied to and a response signal is received from said output end of said first configurable input-output switch means and applied to a selected response measurement device.

12. The invention as defined in claim 11 wherein said test instrumentation means includes:

digital testing means:

said digital testing means being capable of applying a plurality of digital tests under control of said test controller processor means, receiving results of such tests and providing test output data describing test results of such digital tests to said test controller processor means.

13. The invention as defined in claim 6 further comprising:

test station controller processor means coupled to said test controller processor means; said test station controller processor means including memory means for storing program and data information; means in said test controller means for querying said test station controller processor means for selecting program or data information responsive to an absence of said program or data information in said test controller means; and means in said test controller means for sending selected data information to said test station controller means.

14. The invention as defined in claim 13 further including in combination:

factory database means for maintaining master program and data information;

network means coupling said factory database means to said test station controller processor means;

and wherein said test station controller means includes means for querying said factory database means responsive to an absence of program and data information in said memory means of said test station controller processor means.

15. The invention as defined in claim 6 wherein said test instrumentation means includes: a plurality of stimulus signal generating means and a plurality of response measuring means, each of said generating and measuring means being controllable by said test controller processor means with said stimulus generating means being actuated thereby to send signals to an output and said response measuring means being actuated to measure signals provided to its input and send the results as measured to said test controller processor means.

16. In a manufacturing system for assembling and testing electronic units containing any combination of digital, analog and RF circuits, in various stages of assembly, the improvement wherein said manufacturing system includes:

a plurality of testing stations;

said plurality of testing stations being arranged in at least three groups, including:

a first group for testing printed wiring board assemblies, a second group for testing electronic modules formed with said printed wiring board assemblies, and a third group for testing electronic units formed with said electronic modules with said groups being arranged in a serial order of first, second and third in position in said assembly line;

each said testing station including:

test controller processor means;

processor controlled test instrumentation module means for providing test stimulus signals to a unit under test and receiving responses, said test instrumentation module means being under control of and responsive to commands issued by said test controller processor means;

test adaptor means for providing signal connections between said test instrumentation module means and a unit to be tested with said adaptor means being detachably connected to each of said module means and said unit under test;

said test controller processor means enabling said test instrumentation module means to provide test stimulus signals to units under test in a predetermined sequence and for storing responses provided to said test instrumentation module means by said units;

said manufacturing system further including:

a plurality of test station controller processor means, one of said plurality of test station controller means being associated with a corresponding one of said groups of test stations;

each of said test station controller processor means including:

memory means for storing information, including programs and data; and input and output means for inputting and outputting information from said memory means;

first network means for providing processor to processor communications to define a first path for sending and receiving information;

means coupling said plurality of test station controller processor means to said first network means for networking said processor means for permitting communication thereover;

a plurality of second network means for permitting processor to processor communications to define a path for sending and receiving program and data information, said plurality of second network means corresponding in number to the number of groups of said test stations with one of such second network means being associated with a corresponding one of said groups;

means coupling said test controller processor means within each group to the respective second network means associated with said group;

means coupling each of said test station controller processor means of each said group to a corresponding one of said plurality of second network means to enable the test station controller processor means associated with said respective group to communicate with all of said test controller processor means associated with said group, wherein information may be sent between said test controller processor means in said test stations of a particular group and said corresponding one of said plurality of test station controller processor means associated with said group.

17. The invention as defined in claim 16 further comprising:

factory processor means; said factory processor means including a data base for storing master copies of information;

said factory processor means being connected to said first network means for sending information to and receiving information from said plurality of test station controller processor means.

18. The invention as defined in claim 17 wherein said factory processor means includes master fault dictionary database means; and means for sending a copy of said fault dictionary database to said plurality of test station controller processor means.

19. The invention as defined in claim 17 wherein said factory processor means includes repair record database means containing a compilation correlating a particular type of unit under test and types of repairs made to such types of units.

20. The invention as defined in claim 17, further comprising:

means for inputting the repair data covering repairs made to said units under test into said test controller processor means; and means at said test controller processor means for indicting the presence of newly inputted repair information to said test station controller processor means, whereby said repair information is made available by said test station controller processor means for remote transmission to said factory processor means, whereby said repair information may be automatically entered into said master repair record database means.

21. The invention as defined in claim 17 wherein each of said test controller processor means includes monitor means associated therewith for providing visual displays to an operator; and key means containing manually operable keys for permitting an operator to input information to said controller processor means responsive to requests presented by said controller processor means on said monitor means.

22. The invention as defined in claim 16 wherein said test instrumentation module means includes:

digital tester means for testing digital circuits;
analog tester means for testing analog circuits; and
RF tester means for testing RF circuits.

23. The invention as defined in claim 22 wherein each of said test station controller processor means includes:

memory means; said memory means containing at least;

a first program defining a sequence of test vectors, record database means for storing signature responses obtained from said test instrumentation module means responsive to said module means applying test stimulus signals to a unit under test;

fault library database means to define unit faults in respect of a given signature;

repair record database means for storing data obtained in respect of units tested by said test station;

program means for comparing signatures received with signatures contained in said fault library memory and for displaying the library memory information fault selected and storing the fault information in connection with an identification of the particular unit under test; and repair record compilation database means containing a compilation of the kinds and types of faults existent in units placed under test in connection with the kind of unit and in connection with the particular unit.

24. The invention as defined in claim 16 wherein each of said test station controller processor means and said test controller processor means includes:

memory means; said memory means containing at least a first program defining a sequence of test stimulus signals, record database means for storing signature responses obtained from said test instrumentation module means responsive to said module means applying test stimulus signals to a unit under test;

fault library database means to define unit faults in respect of a given signature;

repair record database means for storing data obtained in respect of units tested by said test station;

program means for comparing signatures received with signatures contained in said fault library memory and for displaying the library memory information fault selected and storing the fault information in connection with an identification of the particular unit under test; and repair record compilation database means containing a compilation of the kinds and types of faults existent in units placed under test in connection with the kind of unit and in connection with the particular unit.

25. The invention as defined in claim 23 wherein said test station controller processor means further includes:

means for interrogating said factory database means responsive to operator input to identify the latest version of a selected test program; and means for sending via said first network means repair record update information on units under test to said factory database means for integration in a master repair record compilation database with like information elsewhere obtained, said master repair record compilation database being maintained in said factory database.

26. The invention as defined in claim 16 wherein said test controller processor means includes:

fault dictionary database means containing data relating a particular signature to a particular fault or normal condition; and means responsive to reception of a test signature for looking up said test signature in said fault dictionary and outputting the related data located in said fault dictionary to said display means.

27. A test station for testing of electronic units of the type characterized by a connector means with which to connect with other electronic units and with which to permit access to electronic circuits contained therein, said test station comprising:
- computer means containing a plurality of test programs for executing a test program responsive to operator initiation thereof to provide a series of instructions at a test control output;
- computer controlled test instrument means responsive to said test control output of said computer means for outputting test vectors at an output and inputting test signatures resulting from output of said test vectors;
- operator control means for initiating execution of a selected test program by said computer;
- configurable interface means being controlled by said computer means for interfacing said test instrument means with an adaptor means, wherein test vectors and test signatures may be respectively passed from and to said test instrument means;
- adaptor means for interconnecting said interface means with the connector means of an electronic unit to couple test vectors and test signatures therebetween, wherein test signatures are obtained representative of the collective effect of said test instrument means, said interface means, said adaptor means and said electronic unit under test;
- test result database means stored in said computer means for maintaining a record of test results of units under test;
- means for receiving and temporarily storing test signatures attributed collectively to said test instrument means, said interface means and said adaptor means, exclusive of influence of said electronic unit under test, to provide a source of normalization information;
- test signature receiving means for receiving test signatures representative of the collective effect of said test instrument means, said interface means, said adaptor means and said unit under test; and
- means for subtracting the normalization information from the test signatures received by said test signature receiving means and storing said difference in said test result database means.

28. The invention as defined in claim 27 wherein said test instrument means comprises:
- digital tester means;
- analog tester means; and
- RF tester means; and wherein each of said tester means is individually detachable from said computer and said test adaptor means.

29. A test work station for operator assisted testing of complex electronic system assemblies, the unit under test, comprising:
- test controller processor means, including memory means;
- display means;
- said display means being controlled by said test controller processor means and responsive to said test controller processor means for displaying selected output from said test controller processor means to said test operator, whereby information is supplied to a test operator;
- scanner means;
- said scanner means being coupled to said test controller processor means for inputting information marked on said unit under test and communicating said information to said test controller processor means;
- finger operable key means;
- said key means for permitting a test operator to enter selection information into said test controller processor means responsive to alternative selection choices presented on said display means, wherein a test operator may input information interactively in response to information display on said display means;
- electronic assembly testing means;
- said assembly testing means being capable of applying a plurality of tests to a unit under test under control of said test controller processor means to provide test output data describing test results;
- said assembly testing means including:
- programmable test means for providing stimulus signals and for receiving response signals;
- input means for receiving input test instructions and transmitting same to said programmable test means to permit said programmable test means to perform tests responsive to said input test instructions;
- output means for outputting test results obtained thereby to said controller processor means;
- connecting means for coupling said input means and said output means to said test controller processor means for communicating test results to said processor means and for receiving test instructions from said processor means;
- configurable input-output interface connector means; said configurable input-output interface means having an input coupled to said programmable test means and being controlled by said computer means to configure multiple inputs with multiple outputs to create selective electrical paths therethrough;
- adaptor means for providing an electrical connection between said configurable input-output interface connector means of said electronic assembly testing means and a unit to be tested with said adaptor means being detachably connected to each of said assembly test means and said unit under test;
- calibration load means for temporary connection to said configurable input-output interface means in lieu of said adaptor means to selectively connect together circuits extending through said input-output interface means to allow calibration test of said test assembly means; and
- normalization load means for temporary connection to said adaptor means in lieu of said test unit under test to selectively connect together circuits extending through said adaptor means to allow normalization test of said test assembly means and said adaptor means.

* * * * *